United States Patent
Sugiura et al.

(10) Patent No.: US 7,178,964 B2
(45) Date of Patent: Feb. 20, 2007

(54) SINGLE-LIGHT SOURCE ILLUMINATION DEVICE AND LIQUID CRYSTAL DISPLAY DEVICE USING THE SAME

(75) Inventors: Takuro Sugiura, Fukushima-ken (JP); Mitsuo Ohizumi, Fukushima-ken (JP)

(73) Assignee: ALPS Electric Co., Ltd., Tokyo (JP)

( * ) Notice: Subject to any disclaimer, the term of this patent is extended or adjusted under 35 U.S.C. 154(b) by 149 days.

(21) Appl. No.: 10/357,784

(22) Filed: Feb. 4, 2003

(65) Prior Publication Data

US 2003/0147233 A1 Aug. 7, 2003

(30) Foreign Application Priority Data

Feb. 6, 2002 (JP) .............................. 2002-029731

(51) Int. Cl.
*F21V 7/04* (2006.01)
*G02F 1/1335* (2006.01)

(52) U.S. Cl. ...................... 362/616; 362/612; 362/615; 362/620; 362/623

(58) Field of Classification Search ................. 362/31, 362/339, 561, 24, 610, 600, 612, 615, 620, 362/623; 349/65
See application file for complete search history.

(56) References Cited

U.S. PATENT DOCUMENTS

| | | | |
|---|---|---|---|
| 6,104,453 A | 8/2000 | Watanabe | |
| 6,206,535 B1 * | 3/2001 | Hattori et al. | 362/616 |
| 6,461,007 B1 * | 10/2002 | Akaoka | 362/610 |
| 6,578,977 B2 * | 6/2003 | Egawa et al. | 362/31 |
| 6,609,806 B2 * | 8/2003 | Asakawa et al. | 362/31 |
| 6,644,824 B2 * | 11/2003 | Baba | 362/609 |
| 6,685,330 B2 * | 2/2004 | Miyazaki | 362/610 |
| 6,734,929 B2 * | 5/2004 | Sugiura et al. | 349/65 |
| 6,863,413 B1 * | 3/2005 | Umemoto | 362/615 |
| 6,940,570 B1 * | 9/2005 | Sumida et al. | 349/61 |
| 2003/0043567 A1 * | 3/2003 | Hoelen et al. | 362/31 |

* cited by examiner

Primary Examiner—Sandra O'Shea
Assistant Examiner—Anabel Ton
(74) Attorney, Agent, or Firm—Brinks Hofer Gilson & Lione

(57) ABSTRACT

An illumination device is constructed such that light illuminated by a light emitting element and transmitted through one side surface of a light guiding plate via an intermediate light guide is introduced into the light guiding plate and the light propagating in the light guiding plate is emitted from an output surface of the light guiding plate so as to illuminate a liquid crystal display unit (an illumination object) disposed behind the light guiding plate, such that a part of the light guiding plate, through which the liquid crystal display unit is displayed in a transmissive manner, serves as a display area, and such that the light guiding plate is formed so as to extend beyond the display area of the liquid crystal display unit and towards the light emitting element, along the longitudinal direction of the intermediate light guide.

19 Claims, 12 Drawing Sheets

SINGLE-LIGHT SOURCE ILLUMINATION DEVICE AND LIQUID CRYSTAL DISPLAY DEVICE USING THE SAME

This application claims the benefit of priority to Japanese Patent Application JP2002-029731,filed on Feb. 6, 2002.

BACKGROUND OF THE INVENTION

1. Field of the Invention

The present invention relates to illumination devices and liquid crystal display devices, and more particularly, it relates to an illumination device which uniformly and brightly illuminates a large area with a single light source, and also to a liquid crystal display device using the same.

2. Description of the Related Art

A conventional front light of a liquid crystal display device has a unit structure including a light source, an intermediate light guide, a light guiding plate, and a casing integrally holding these components and having a reflective inner surface.

FIG. 21A is a perspective view illustrating the structure of such a liquid crystal display device and FIG. 21B is a plan view illustrating the structure of the liquid crystal display device shown in FIG. 21A. The liquid crystal display device shown in these figures is formed of a liquid crystal display unit 120 and a front light 110 disposed close to the front surface of the liquid crystal display unit 120. Although not illustrated in detail in the figures, the liquid crystal display unit 120 is of a reflective type performing a display by reflecting light incident on its front surface and is formed of mutually opposing upper and lower substrates 121 and 122, and a liquid crystal layer held therebetween. That is, the display is performed by controlling the alignment of the liquid crystal layer so as to change the transmitting state of the incident light.

The front light 110 is formed of a flat light guiding plate 112 including a side surface 112a, a rod-shaped intermediate light guide 113 disposed on the side surface 112a, and a light emitting element 115 disposed on one end surface of the intermediate light guide 113. The upper surface of the light guiding plate 112 is formed so as to have a plurality of mutually parallel, prismatic projections 114, each having a wedge shape in plan view. These projections 114 are formed at a slightly oblique angle with respect to the side surface 112a of the light guiding plate 112 so as to prevent moire fringes.

In the front light 110, light emitted from the light emitting element 115 is incident on the side surface 112a of the light guiding plate 112 via the intermediate light guide 113 and is introduced into the light guiding plate 112. Then, the light is reflected at the inner side of the prismatic upper surface of the light guiding plate 112 so as to change its propagating direction and is incident on the liquid crystal display unit 120 through the lower surface (shown in FIG. 21A) of the light guiding plate 112.

In portable electronic apparatuses such as a portable information terminal and a portable game machine, the usability of these apparatuses is largely affected by a battery use time. Therefore, in order to reduce electric power consumption of a front light of a liquid crystal display device used as a display portion of each portable electronic apparatus, a single-light-source front light such as the front light 110 shown in FIG. 21A and having the light emitting element 115 as a single light source has been used. That is, it is required to reduce electric power consumption by reducing the number of light emitting elements. Also, it is required to make the front light 110 thinner to the order of 1 mm due to the requirement for compactness of the portable electronic apparatuses.

However, such a single-light-source front light including a combination of a thin light guiding plate and a single light emitting element has been almost impossible to uniformly and brightly illuminate an area of a several-inch or larger display screen. More particularly, when the front light 110 has the light emitting element 115 disposed on its one side as shown in FIG. 21A, the intermediate light guide 113 is required to make incident light uniform along the side surface 112a of the light guide 112 so as to uniformly introduce the incident light emitted from the light emitting element 115 into the light guiding plate 112. However, since it is difficult for the intermediate light guide 115 to make light uniformly incident on the light guiding plate 112, it is very difficult for the light guiding plate 112 to uniformly emit light from its entire surface. As a result, the front light 110 has a problem in which, in an especially remarkable case, a triangular dark area 118 as shown in FIG. 21B occurs in the vicinity of a side (the left side in the figure), close to the light emitting element 115, of the light guiding plate 112, thereby causing a reduced visibility of a liquid crystal display device.

Also, when the light guiding plate 112 is made thin so as to make a portable electronic apparatus thin and compact, light propagating in the light guiding plate 112 is likely to leak out therefrom upon reflection against the inner surface thereof, thereby causing a problem in which the farther an area of the light guiding plate 112 is away from the light emitting element 115, the drastically less the quantity of light is incident on the area.

Although a front light using a single light emitting element as a light source has been increasingly required as described above, a thin front light able to uniformly and brightly illuminate a large area has not been achieved.

SUMMARY OF THE INVENTION

Accordingly, it is an object of the present invention to provide an illumination device which can uniformly and brightly illuminate a large area with reduced electric power consumption.

Also, it is another object of the present invention to provide a liquid crystal display device including the foregoing illumination device so as to perform a high quality display with a high luminance.

To achieve the above-mentioned objects, an illumination device and a liquid crystal display device according to the present invention are constructed in the following manner.

An illumination device according to the present invention comprises a light guiding plate; an intermediate light guide disposed along one side surface of the light guiding plate; and a light emitting element disposed on a longitudinal end surface of the intermediate light guide. Light illuminated by the light emitting element and transmitted through the one side surface of the light guiding plate via the intermediate light guide is introduced into the light guiding plate and the light propagating in the light guiding plate is emitted from an output surface of the light guiding plate so as to illuminate an illumination object disposed behind the light guiding plate. Also, a part of the light guiding plate, through which the illumination object is displayed in a transmissive manner, serves as a display area. In addition, the light guiding plate is formed so as to extend beyond the display area and towards the light emitting element, along the longitudinal direction of the intermediate light guide.

In other words, the illumination device according to the present invention has a structure in which the light guiding plate is extended along the longitudinal direction of the intermediate light guide and towards the light emitting element so as to displace a part of the light guiding plate, the part lying close to the light emitting element, and being especially likely to output a reduced quantity of light in comparison to the other part of the light guiding plate, from the other part of the light guiding plate serving as the display area, thereby achieving a substantially uniform quantity of output light. Here, the display area of the illumination device according to the present invention is defined as an area of the light guiding plate through which the illumination object disposed behind the illumination device is displayed in a transmissive manner, and practically, it is equivalent to an area of the light guiding plate which corresponds to the profile of the illumination object in plan view or the display area of the illumination object.

In the illumination device according to the present invention, the light guiding plate has two surfaces, one serving as an output surface and the other serving as a reflective surface for reflecting light propagating in the light guiding plate, the reflective surface including a plurality of mutually parallel, prismatic grooves, each having a wedge shape in sectional view, and the extending direction of the prismatic grooves forms an oblique angle with the one side surface of the light guiding plate on which the intermediate light guide is disposed.

This structure prevents moire fringes due to optical interference caused by the prismatic grooves of the light guiding plate and the periodic shape or pattern of the illumination object formed at a predetermined pitch. For example, when the illumination object is a liquid crystal display device, the alignment of pixels formed in a matrix array and the prismatic grooves generally cause optical interference. However, with the foregoing structure, such more fringes can be prevented and good visibility can be obtained.

In the illumination device according to present invention, the prismatic grooves preferably extend so as to form an oblique angle α greater than 0° and not more than 10° with the one side surface of the light guiding plate on which the intermediate light guide is disposed, and the prismatic grooves more preferably extend so as to form the oblique angle α in the range from 6.5° to 8.5°.

With this structure, a uniform quantity of light can be output from its entire output surface, and optical interference caused by the illumination object and the prismatic grooves of the light guiding plate can be more effectively prevented. Especially when the periodic shape or pattern of the illumination object includes a straight line parallel to the side surface of the light guiding plate on which the intermediate light guide is disposed and when the foregoing shape or pattern is formed periodically in a direction orthogonal to the foregoing side surface of the light guiding plate, the optical interference can be more effectively prevented.

When the oblique angle α is equal to or less than 0° or greater than 10°, the above-mentioned effect is not obtained. When the oblique angle α of the prismatic grooves is set in the range from 6.5° to 8.5°, the illumination device outputs a more uniform distribution of the quantity of light and also more effectively prevents moire fringes caused by the prismatic grooves thereof and the illumination object.

In the illumination device according to the present invention, when the light guiding plate extends towards the light emitting element by a length of ΔW, the extended width ΔW, the oblique angle α of the prismatic grooves, and the length L of the light guiding plate, the length L being orthogonal to the extending direction of the intermediate light guide, satisfy the condition: $\Delta W \geq L \times \tan \alpha$.

By setting the extended width of the light guiding plate so as to satisfy the foregoing condition, a dark area produced in a part of the light guiding plate, the part lying close to the light emitting element, can be reliably displaced outside the display area of the light guiding plate, thereby allowing the illumination device to output an excellently uniform quantity of light from the display area.

An illumination device according to the present invention comprises a light guiding plate; an intermediate light guide disposed along two side surfaces of the light guide plate; and a light emitting element disposed on the intermediate light guide. The light guiding plate includes two mutually opposing surfaces, one serving as an output surface and the other serving as a reflective surface for reflecting light propagating in the light guiding plate, the reflective surface including a plurality of mutually parallel, prismatic grooves, each having a wedge shape in sectional view and extending so as to form an oblique angle with any one of the two side surfaces of the light guiding plate on which the intermediate light guide is disposed. Also, the intermediate light guide comprises two light guiding sections disposed in an L-shaped configuration in plan view and along the two neighboring side surfaces of the light guide plate.

With this structure, light is incident on the two side surfaces of the light guiding plate. As a result, an increased quantity of light is introduced into a side part of the light guiding plate, wherein the side part lies close to the light emitting element and has been likely to output a reduced quantity of light in the conventional illumination device with a single light source, thereby allowing the light guiding plate to output a uniform quantity of light over the entire output surface thereof.

An illumination device according to the present invention comprises a light guiding plate; an intermediate light guide disposed along one side surface of the light guiding plate; and a light emitting element disposed on a longitudinal end surface of the intermediate light guide. The light guiding plate includes two mutually opposing surfaces, one serving as an output surface and the other serving as a reflective surface for reflecting light propagating in the light guiding plate, the reflective surface including a plurality of mutually parallel, prismatic grooves, each having a wedge shape in sectional view and extending so as to form an oblique angle with the one side surface of the light guiding plate on which the intermediate light guide is disposed. Also, the light guiding plate has a reflective film formed on another side surface thereof, lying adjacent to the one side surface thereof on which the intermediate light guide is disposed and lying close to the light emitting element.

In the illumination device having the above-described structure, the reflective film is disposed on the side surface of the light guiding plate, the side surface lying close to the light emitting element. The reflective film prevents leakage of light from the foregoing side surface and returns light reflected thereat back to the light guiding plate, thereby effectively preventing the quantity of light output from the side part of the light guiding plate from being reduced and thus outputting an excellently uniform quantity of light.

In the illumination device according to the present invention, each of the prismatic grooves is formed of a pair of slopes, each having a sloped angle with respect to the reflective surface, and one steep slope close to the intermediate light guide is formed so as to have a greater slope angle than the other gentle slope, and also the slope angle θ1 of the gentle slope is in the range from 1.0° to 10° and the slope angle θ2 of the steep slope is in the range from 42° to 44°.

With this structure, the quantity distribution of light output from the output surface of the light guiding plate can be made uniform and also light propagating in the light guiding plate can be effectively introduced to the output surface, thereby allowing the illumination device to output an excellently uniform quantity of light with a high luminance. When the slope angle θ1 of the gentle slope is less than 1.0° or greater than 10°, the luminance of the illumination device decreases or becomes less uniform, respectively. Also, when the slope angle θ2 of the steep slope is less than 42° or greater than 44°, the luminance of the illumination device decreases.

In the illumination device according to the present invention, the outer side surface of the intermediate light guide serves as a prismatic surface formed so as to have a plurality of grooves, each having a wedge shape in sectional view, and the prismatic surface has a reflective film formed thereon. Light introduced into the intermediate light guide from the light emitting element propagates in the intermediate light guide and is reflected against the prismatic surface so as to be emitted from the surface of the intermediate light guide opposing the prismatic surface and to be then introduced into the light guiding plate. With this structure, since the reflective film is formed on the prismatic surface, the reflectance of the prismatic surface is improved, thereby leading to an increased quantity of light reflected towards the light guiding plate. Accordingly, the quantity of light introduced into the light guiding plate increases, and as a result, the luminance of the illumination device can be improved.

In the illumination device according to the present invention may further comprise a light shield so as to cover the intermediate light guide, the light emitting element, and a part of the light guiding plate extending, the part lying close to the intermediate light guide; and a reflective film formed on the inner surface of the light shield. With this structure, since the reflective film can return light leaked out from the side surfaces of the intermediate light guide or from the connecting surface between the light guiding plate and the intermediate light guide back to the intermediate light guide so as to use it as illumination light, light illuminated from a light source can be more effectively used, thereby leading to an improved luminance of the illumination light.

A liquid crystal display device according to the present invention comprises any one of the foregoing the illumination devices; and a liquid crystal display unit disposed close to the output surface of a light guiding plate of the illumination device. Since the liquid crystal display device includes the illumination device which can uniformly illuminate a large area with a high luminance, a uniformly bright, high quality display with a high luminance can be performed. Also, even when the illumination device is provided with a single light emitting element, a uniformly bright distribution of light can be achieved, thereby allowing the liquid crystal display device to perform a high quality display with reduced electric power consumption.

A liquid crystal display device according to the present invention comprises (1) an illumination device including a light guiding plate; an intermediate light guide disposed along one side surface of the light guiding plate; and a light emitting element disposed on a longitudinal end surface of the intermediate light guide, wherein the light guiding plate includes two mutually opposing surfaces, one serving as an output surface for outputting light which is emitted from the light emitting element and which is introduced into the light guiding plate via the intermediate light guide, and the other serving as a reflective surface for reflecting light propagating in the light guiding plate and including a plurality of mutually parallel, prismatic grooves, each having a wedge shape in sectional view, and (2) a liquid crystal display unit disposed so as to oppose the output surface of the light guiding plate. The prismatic grooves of the light guiding plate have a pitch P1 in the range (1/2)P0<P1<(3/4)P0 with respect to the pitch P0 of pixels of the liquid crystal display unit.

When the pixel pitch P0 of the liquid crystal display unit and the pitch P1 of the prismatic grooves are set so as to satisfy the foregoing condition, optical interference caused by the periodic structures of the pixels and the prismatic grooves is prevented, whereby moire fringes due to the optical interference can be prevented from causing the liquid crystal display device to have reduced visibility.

When the pitch P1 is not in the range from (1/2)P0 to (3/4)P0, the moire fringes due to the optical interference are likely to occur.

In the liquid crystal display device according to the present invention, the prismatic grooves preferably extend so as to form an angle β greater than 0° and not more than 10° with the aligning direction of the pixels, aligned along the extending direction of the intermediate light guide, of the liquid crystal display device, and the prismatic grooves more preferably extend so as to form the angle β in the range from 6.5° to 8.5° with the aligning direction of the pixels, aligned along the extending direction of the intermediate light guide, of the liquid crystal display device.

That is, the angle β is defined as an oblique angle of the prismatic grooves with respect to the alignment direction of the pixels. When the angle β is equal to or less than 0° or greater than 10°, the moire fringes are unlikely to be prevented. When the angle β is set in the range from 6.5° to 8.5°, since the optical interference can be almost perfectly prevented, the liquid crystal display device having very good visibility can be achieved. When the alignment direction of the pixels of the liquid crystal display unit is parallel to the light-incident surface of the light guiding plate, the angle β formed between the prismatic grooves in this structure and the alignment direction of the pixels is equal to the foregoing oblique angle α of the prismatic grooves. It is confirmed by examples, which will be described in detail later in EXAMPLES, that the above-mentioned range of the oblique angle β is reasonable.

In the liquid crystal display device according to the present invention, the liquid crystal display unit comprises mutually opposing upper and lower substrates and liquid crystal molecules held between these substrates and having a positive dielectric anisotropy. The lower substrate has a reflective layer and a color filter laminated on the inner surface thereof in that order, and also the reflective layer has a reflection characteristic in which its reflected luminance is substantially constant over the region of a reflection angle not less than 15°.

With this structure, since a display having a constant luminance over a wide viewing angle is obtained, thereby allowing the liquid crystal display device to have great availability.

In the liquid crystal display device according to the present invention, the reflective layer has a reflection characteristic in which the distribution of its reflected luminance is substantially symmetrical with respect to the specular reflection angle of incident light.

With this structure, the liquid crystal display device is configured such that reflected light is diffused in a predetermined angle range from the specular reflection direction of incident light.

In the liquid crystal display device according to the present invention, the reflective layer has a reflection characteristic in which the distribution of its reflected luminance is asymmetrical with respect to the specular reflection angle of incident light.

With this structure, the luminance of reflected light (display light) in a predetermined direction can be improved. For example, even when the liquid crystal display device is operated by a user who views from a different direction from the specular direction of the liquid crystal display device, the luminance in the direction from which the user views the display device can be maintained, thereby allowing the liquid crystal display device to have greater availability.

In the liquid crystal display device according to the present invention, the liquid crystal display unit is of an active matrix type.

In the liquid crystal display device according to the present invention, the liquid crystal display unit is of a passive matrix type.

In any type of the liquid crystal display devices, since the illumination device according to the present invention is disposed on the front surface of the liquid crystal display unit, a high quality display which is uniformly bright over the entire surface of the display area of the liquid crystal display unit and which are free from moire fringes can be obtained.

DESCRIPTION OF THE PREFERRED EMBODIMENTS

Preferred embodiments of the present invention will be described with reference to the accompanying drawings.

FIRST EMBODIMENT

Figure 1:
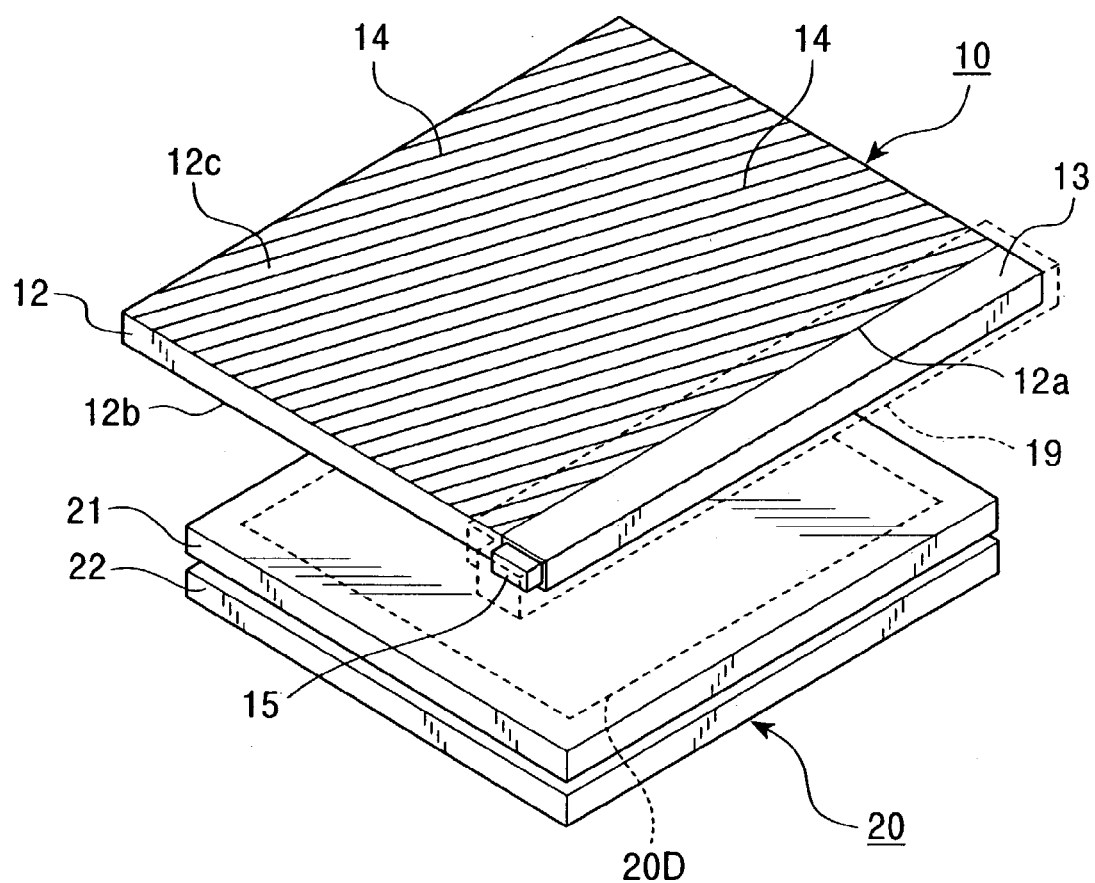
FIG. 1 is a perspective view illustrating the structure of a liquid crystal display device according to a first embodiment of the present invention.
Figure 2:
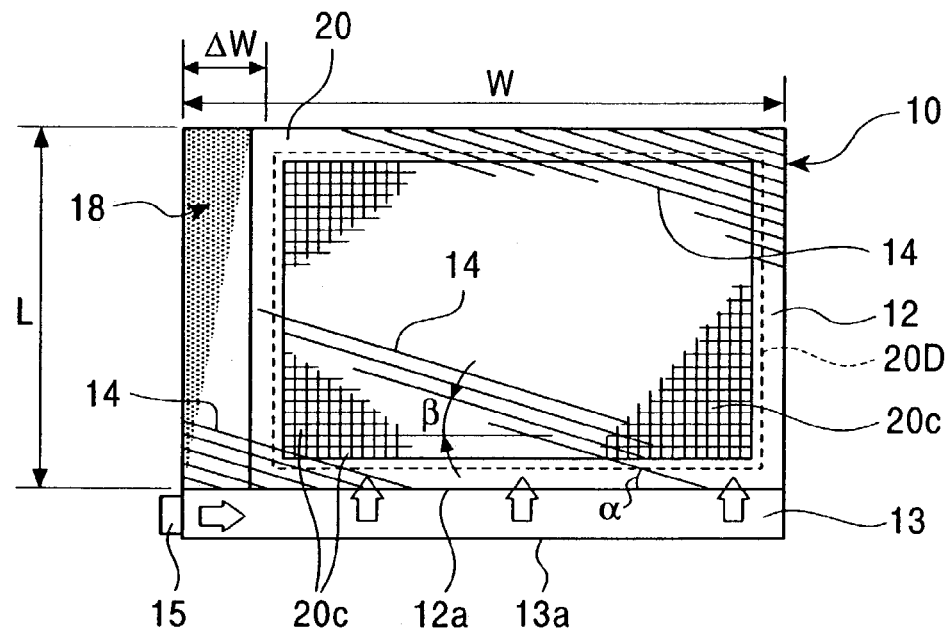
FIG. 2 is a plan view illustrating the structure of the liquid crystal display device shown in FIG. 1.
Figure 3:
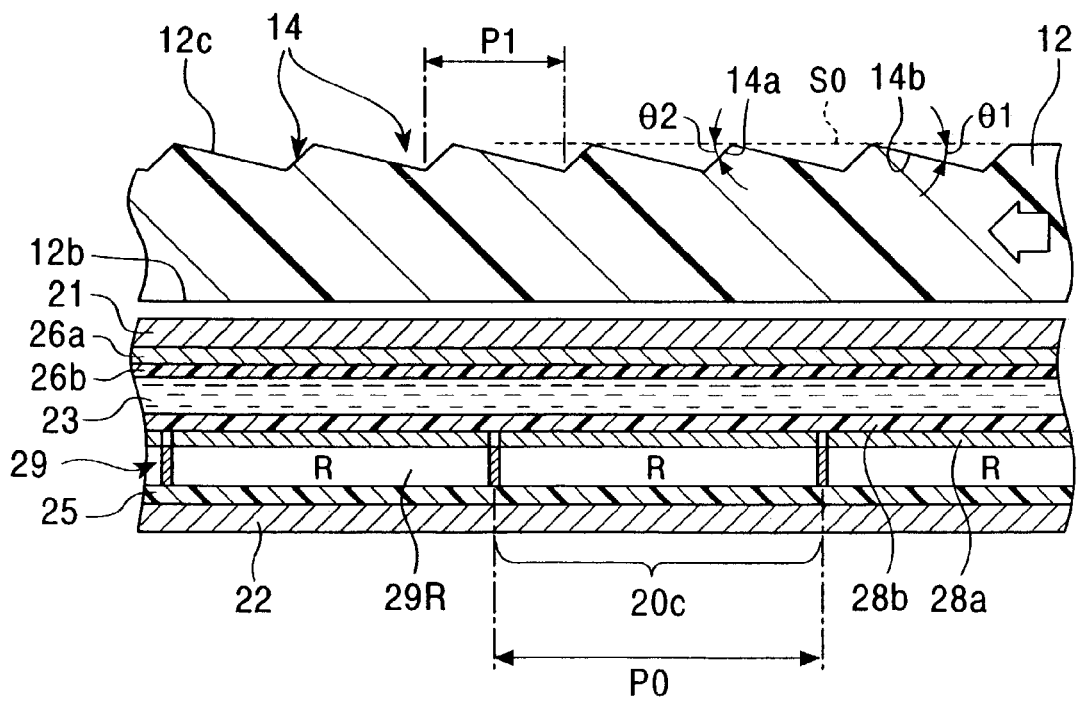
FIG. 3 is a sectional view illustrating the structure of the liquid crystal display device shown in FIG. 1.

FIG. 1 is a perspective view illustrating the structure of a liquid crystal display device according to a first embodiment of the present invention, and FIGS. 2 and 3 are respectively a plan view and a sectional view illustrating the structure of the liquid crystal display device shown in FIG. 1. As shown in FIGS. 1 to 3, the liquid crystal display device according to the first embodiment is formed of a front light (an illumination device) 10 and a liquid crystal display unit 20 disposed behind the front light 10 (at the lower side in the figure).

As shown in FIG. 1, the front light 10 is formed of a substantially flat light guiding plate 12, an intermediate light guide 13 disposed on a side surface 12a of the light guiding plate 12, a light emitting element 15 disposed on one end surface of the intermediate light guide 13, a casing (a light shield) 19 disposed so as to cover the intermediate light guide 13, the light emitting element 15, and a part of the light guiding plate 12, the part lying close to the intermediate light guide 13, from the side of the intermediate light guide 13. Also, as shown in FIG. 2, the outer surface (the upper surface in the figure) of the light guiding plate 12 is formed so as to have a plurality of prismatic grooves 14 aligned to be at an oblique angle α with respect to the side surface 12a on which the intermediate light guide 13 is disposed.

The liquid crystal display unit 20 is formed of mutually opposing upper and lower substrates 21 and 22 and has a rectangular area 20D shown by a dotted line in FIG. 1 and serving as a display area thereof. As shown in FIG. 2, the display area 20D has a plurality of pixels 20c therein formed in a matrix array.

The liquid crystal display device according to the first embodiment has a feature in which, as shown in FIG. 2, the light guiding plate 12 of the front light 10 is formed so as to extend beyond the display area 20D of the liquid crystal display unit 20 and towards the light emitting element 15 to a large extent. More particularly, the light guiding plate 12 is formed so as to have a width W which extends in the horizontal direction in the figure and which is greater than the length, extending along the longitudinal direction of the intermediate light guide 13, of the display area 20D of the liquid crystal display unit 20; that is, the light guiding plate 12 is formed so as to extend horizontally outside the display area 20D by an extended width ΔW shown in FIG. 2.

With this structure, a dark area 18 (an area transmitting a less quantity of light than its surrounding area) which is produced in a part of the light guiding plate 12, the part lying close to the light emitting element 15, is prevented from overlapping the display area 20D of the liquid crystal display unit 20, and thus a uniformly bright display is provided by using an area, from which uniform light is transmitted, of the light guiding plate 12 as a display area.

In the front light 10 with a single light source shown in FIGS. 1 and 2, the prismatic grooves 14 are obliquely formed with respect to the side surface 12a of the light guiding plate 12 so as to uniformly distribute the quantity of light, to align the pixels 20c of the liquid crystal display unit 20 in a periodic manner, and to reduce moire fringes due to optical interference. In such a front light 10, since light emitted from the light emitting element 15 is likely introduced from the corner of the light guiding plate 12, the corner lying close to the light emitting element 15, and then along the diagonal line of the light guiding plate 12, the quantity of light emitted from the light guiding plate 12 tends to decrease in an area of the light guiding plate 12, the area lying close to the light emitting element 15 with respect to the horizontal direction in the figure, thereby causing the dark area 18 shown in FIG. 2 to be produced in the light guiding plate 12. As shown in FIG. 2, the dark area 18 is produced so as to have an inverted triangular shape, expanding upwards, along the left side of the light guiding plate 12, from the lower side thereof close to the intermediate light guide 13 to the upper side thereof facing away from the intermediate light guide 13. Accordingly, in order to prevent the dark area 18 from overlapping the display area 20D of the liquid crystal display unit 20, the extended width ΔW is preferably at least equal to the width of the dark area 18, the width extending along the leftmost part of the upper side of the light guiding plate 12 in the figure.

The extended width of the light guiding plate 12 of the front light 10 is preferably as small as possible from the view point of reductions in size and manufacturing cost of a liquid crystal display device. When the oblique angle α of the prismatic grooves 14 and a length L of the light guiding plate 12 are used, the minimum extended width ΔW of the light guiding plate 12 according to the present invention is preferably equal to L×tan α.

Since the dark area 18 is substantially correlative with the oblique angle α of the prismatic grooves 14 of the light guiding plate 12, the greater the oblique angle α, the greater the width of the dark area 18. This is due to the fact that light propagating in the light guiding plate 12 is likely to propagate in a direction orthogonal to the prismatic grooves 14. Consequently, it is considered that the width of the dark area 18 is nearly equal to L×tan α, using the oblique angle α of the prismatic grooves 14 and the length L of the light guiding plate 12, the length extending vertically in the figure (a light guiding direction). When the extended width ΔW of the light guiding plate 12 is set so as to be at least L×tan α, the dark area 18 lies outside the display area 20D of the liquid crystal display unit 20 and an area of the light guiding plate 12, from which uniform light is transmitted, can be used for performing a display.

Referring now to the drawings, the components of the liquid crystal display device according to the first embodiment will be described in detail.

Front Light

The light guiding plate 12 of the front light 10 is a flat member disposed above the display area of the liquid crystal display unit 20 so as to guide the light emitted from the light emitting element 15 into the liquid crystal display unit 20, and it is composed of a transparent acrylic resin or the like. As shown in FIG. 3, the upper surface shown in the figure (the surface facing away from the liquid crystal display unit 20) of the light guiding plate 12 is formed so as to serve as a prismatic surface 12c having the prismatic grooves 14, each having a wedge shape in sectional view, which are parallel to each other and which are aligned in a stripe array in plan view. Also, the lower surface shown in the figure (the surface facing the liquid crystal display unit 20) of the light guiding plate 12 is formed so as to serve as an output surface 12b from which light for illuminating the liquid crystal display unit 20 is emitted. Each prismatic groove 14 consists of a pair of slopes formed at sloped angles with respect to a reference surface S0 of the prismatic surface 12c, one serving as a steep slope 14a and the other serving as a gentle slope 14b formed so as to have a smaller sloped angle than that of the steep slope 14a. Light propagating in the light guiding plate 12 from the right to the left as shown by an arrow indicated in the figure is reflected at the steep slopes 14a of the prismatic surface 12c and directed towards the output surface 12b so as to illuminate the liquid crystal display unit 20 disposed behind the light guiding plate 12.

In the front light 10 according to the first embodiment, as shown in FIGS. 1 and 2, the prismatic grooves 14 of the prismatic surface 12c are formed so as to extend at an oblique angle with respect to the side surface 12a of the light guiding plate 12. More particularly, as shown in FIG. 2, the oblique angle α of the prismatic grooves 14, which is formed between the prismatic grooves 14 and the side surface 12a, is preferably set so as to be greater than 0° and not more than 10°. With this angle range, the quantity of light emitted from the surface of the light guiding plate 12 is uniformly distributed. The oblique angle α is more preferably set in the range from 6.5° to 8.5°. By setting the oblique angle α in this angle range, moire fringes can be prevented and the quantity of emitted light is uniformly distributed in an excellent manner.

The light guiding plate 12 is composed of glass, one of transparent resins including an acrylic resin, a polycarbonate resin, and an epoxy resin, or the like. To give an actual example, ARTON (brand name, made by JSR Corporation) or ZEONOR (brand name, made by Zeon Corporation) is suitably used, although not limited to them.

As the light guiding plate 12 becomes thicker, light propagating in the light guiding plate 12 is more unlikely to leak out, and also the quantity of light emitted from the front light 10 is more uniformly distributed. Accordingly, the light guiding plate 12 preferably has a thickness of at least 0.8 mm and more preferable has a thickness of at least 1.0 mm. However, when the thickness becomes equal to or greater than 1.5 mm, since the reflected luminance of the front light 10 is likely to decrease, the thickness should be 1.5 mm at the maximum from the viewpoint of reducing the thickness of the front light 10.

Figure 4:
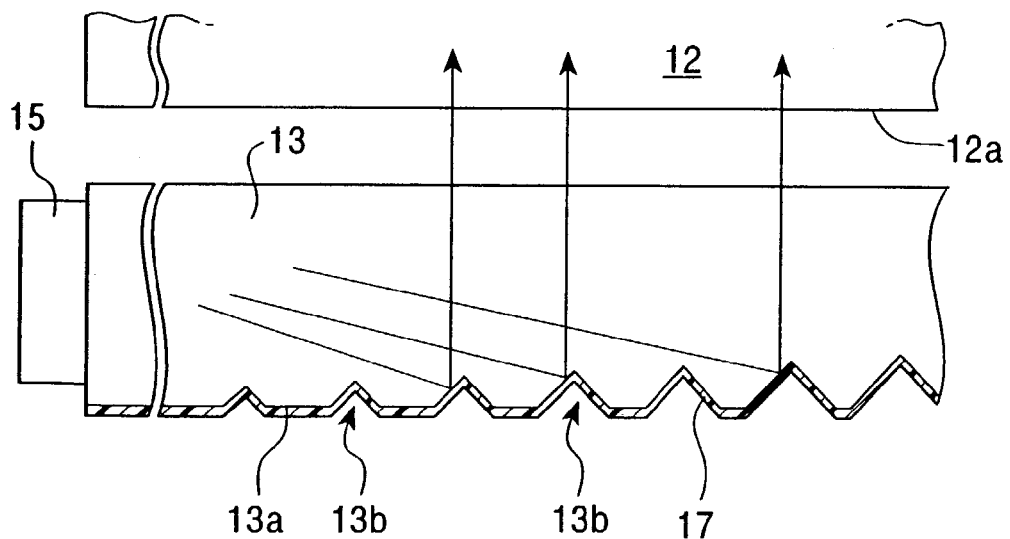
FIG. 4 is a magnified plan view illustrating an intermediate light guide shown in FIG. 2.

The intermediate light guide 13 is a quadratic-prism shaped transparent member extending along the side surface 12a of the light guiding plate 12 and has the light emitting element 15 disposed on the one end surface thereof. FIG. 4 is a magnified plan view illustrating the structure of the intermediate light guide 13. As shown in FIG. 4, the lower surface shown in the figure (the surface facing away from the light guiding plate 12) of the intermediate light guide 13 is formed so as to serve as a prismatic surface 13a having a plurality of mutually parallel grooves 13b, each having a wedge shape in plan view. Thus, the light emitted from the light emitting element 15 propagates in the intermediate light guide 13 and along the longitudinal direction thereof and is reflected against the inner surfaces of the wedge-shaped grooves 13b so as to be emitted to the light guiding plate 12. As shown in FIG. 4, as each of the wedge-shaped grooves 13b lies farther away from the light emitting element 15, it is formed more deeply so as to make the light emitted from the light emitting element 15 uniformly incident on the side surface 12a of the light guiding plate 12.

The prismatic surface 13a including the wedge-shaped grooves 13b has a reflective film 17 formed thereon, which is made from a thin film composed of a highly reflective metal such as Al or Ag, so that the reflective film 17 increases the reflectance of the prismatic surface 13a so as to increase the quantity of light incident on the light guiding plate 12.

The intermediate light guide 13 is composed of glass, one of transparent resins including an acrylic resin, a polycarbonate resin, and an epoxy resin, or the like. The light emitting element 15 may be a white LED (a light emitting diode), an organic EL (electroluminescence) element, or the like, although not limited to them as long as it can be disposed on the one end surface of the intermediate light guide 13.

Figure 5:
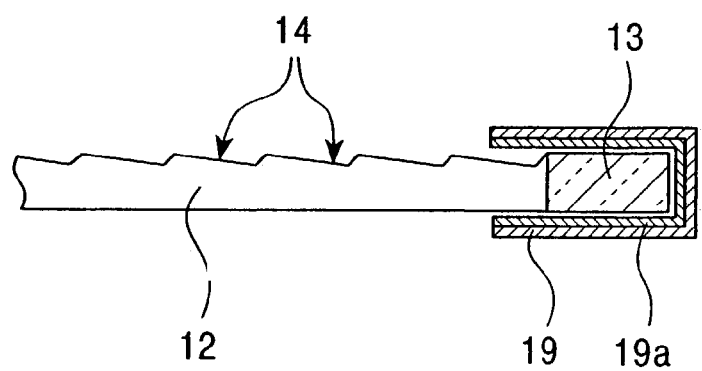
FIG. 5 is a sectional view in part of a front light shown in FIG. 1.

As shown in FIG. 1, the casing 19 is disposed close to the intermediate light guide 13 of the front light 10. FIG. 5 illustrates the sectional structure of the front light 10 including the casing 19. As shown in FIG. 5, the casing 19 has a reflective film 19a, formed on the inner surface thereof, made from a thin film composed of a highly reflective metal such as Al or Ag. Since light having leaked out from the intermediate light guide 13 and the side surface 12a of the light guiding plate 12 is reflected at the reflective film 19a, the reflected light is incident again on the intermediate light guide 13 so as to be used for illumination. With this structure, the front light 10 according to the first embodiment more effectively makes use of the light emitted from the light emitting element 15 and illuminates the liquid crystal display unit 20 with a high luminance.

Although the front light 10 has a structure in which the reflective film 19a is formed on the inner surface of the casing 19, the front light 10 is not limited to this structure; but it may have another structure as long as the other structure can turn the light having leaked out from the intermediate light guide 13 back to the intermediate light guide 13. For example, the casing 19 itself may be formed of a reflective metal material, or the intermediate light guide 13 and the light guiding plate 12 may have reflective metal thin films formed on the side surfaces thereof so as to prevent leakage of light from the side surfaces of the intermediate light guide 13 and the light guiding plate 12.

Liquid Crystal Display Unit

The liquid crystal display unit 20 is of a reflective, passive matrix type performing a color display, and, as shown in FIG. 3, it is formed of the mutually opposing upper and lower substrates 21 and 22 and a liquid crystal layer 23 held therebetween. The upper substrate 21 has a plurality of strip-shaped transparent electrodes 26a, extending along the horizontal direction in the figure, and an alignment film 26b formed on the inner surface thereof in that order. The lower substrate 22 has a reflective layer 25, a color filter layer 29, a plurality of transparent electrodes 28a, and an alignment film 28b formed on the inner surface thereof in that order. Each of the transparent electrodes 26a and the transparent electrodes 28a has a flat strip shape and each group of the electrodes are aligned in a stripe array in plan view. The transparent electrodes 26a the transparent electrodes 28a are disposed so as to extend orthogonal to each other in plan view. With this arrangement, each transparent electrode 26a and each transparent electrode 28a form an intersection so as to provide one dot of the liquid crystal display unit 20, and one of three color filters, which will be described later, is disposed so as to correspond to each dot. As shown in FIG. 3 and other figures, one pixel 20c of the liquid crystal display unit 20 is formed of three dots respectively providing three colors of R (red), G (green), and B (blue). Also, as shown in FIG. 2, in the display area 20D, a large number of the pixels 20c are disposed in a matrix array in plan view.

The color filter layer 29 is formed of red, green, and blue color filters 29R, 29G, and 29B which are arrayed in a periodic manner. Each color filter is formed under the corresponding transparent electrode 28a and a set of the color filters 29R, 29G, and 29B is disposed so as to correspond to each pixel 20c. By driving the transparent electrode 28a corresponding to each of the color filters 29R, 29G, and 29B, a color of the pixel 20c to be displayed is controlled.

In the liquid crystal display device according to the first embodiment, the prismatic grooves 14 formed on the light guiding plate 12 of the front light 10 extend at an angle with the alignment direction of the pixels 20c of the liquid crystal display unit 20. That is, in the liquid crystal display unit 20, by periodically disposing the color filters 29R, 29G, and 29B, providing a periodic pattern, of the color filter layer 29 along a direction which is not parallel to the extending direction of the prismatic grooves 14, moire fringes caused by optical interference due to the relationship between these two directions are prevented.

Figure 6:
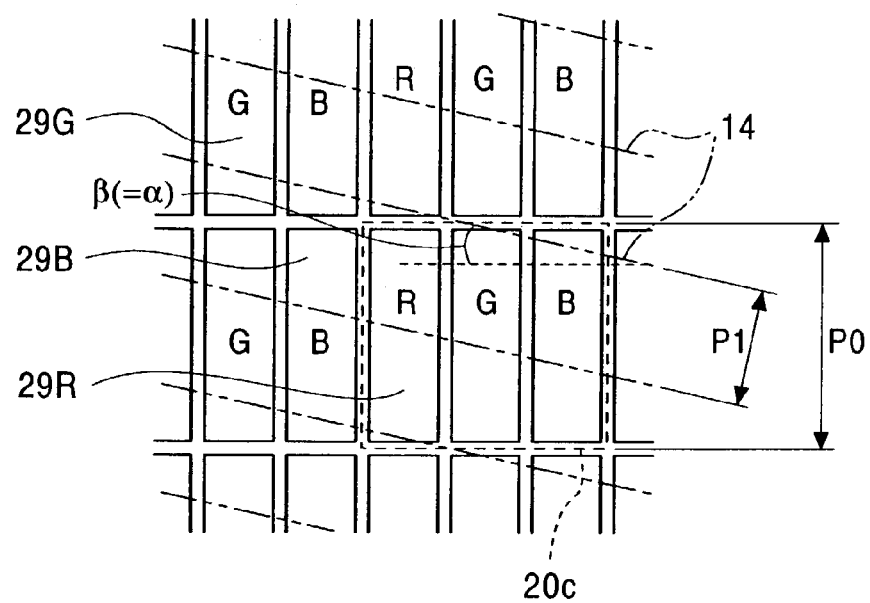
FIG. 6 is a magnified plan view illustrating the configuration of pixel groups of the liquid crystal display unit shown in FIG. 2.

FIG. 6 is a magnified plan view illustrating the configuration of neighboring pixel groups of the liquid crystal display unit 20 shown in FIG. 2. As shown in the figure, the liquid crystal display unit 20 has the plurality of pixels 20c formed in a matrix array in plan view, and each pixel 20c provided with one set of the red, green, and blue color filters 29R, 29G, and 29B. As shown in FIG. 6, in the liquid crystal display device according to the first embodiment, the extending direction (indicated by a two-dot chain line shown in FIG. 6) of the prismatic grooves 14 of the front light 10 is at an oblique angle $\beta$ with respect to the alignment direction (the horizontal direction in the figure) of the pixels 20c of the liquid crystal display unit 20.

The oblique angle $\beta$ of the prismatic grooves 14 with respect to the alignment direction of the pixels 20c is preferably greater than 0° and not more than 10°, and more preferably, it is in the range from 6.5° to 8.5°. By setting the oblique angle $\beta$ in the former angle range, moire fringes caused by optical interference due to the relationship between the periodical array of the pixels 20c of the liquid crystal display unit 20 and the oblique angle $\beta$ of the prismatic grooves 14 can be prevented. When the oblique angle $\beta$ is out of this angle range, the moire fringes are unlikely reduced. By setting the oblique angle $\beta$ in the range from 6.5° to 8.5°, the moire fringes can be more effectively prevented.

In the liquid crystal display device according to the first embodiment, as shown in FIG. 2, since the side surface 12a of the light guiding plate 12 of the front light 10 is arranged so as to extend parallel to the alignment direction of the pixels 20c, the oblique angle $\alpha$ formed between the extending direction of the prismatic grooves 14 and the side surface 12a coincides with the oblique angle $\beta$ formed between the extending direction of the prismatic grooves 14 and the alignment direction of the pixels 20c. However, when the side surface 12a of the light guiding plate 12 does not extend parallel to the alignment direction of the pixels 20c, the oblique angles $\alpha$ and $\beta$ are different from each other. In this case, in order to reduce moire fringes, it is preferably to give priority to the oblique angle $\beta$ so as to set in the above angle range, rather than to the oblique angle $\alpha$. When the oblique angle $\beta$ is determined, the extending direction of the prismatic grooves 14 is accordingly determined. Therefore, in order to uniformly distribute the quantity of light emitted from the light guiding plate 12, the side surface 12a of the light guiding plate 12 is arranged so as to form an angle with the prismatic grooves 14 in the foregoing angle range of the oblique angle $\alpha$.

The liquid crystal display unit 20 has periodic patterns extending horizontally and vertically, as shown in the figure. The horizontally extending periodic pattern, in which the color filters 29R, 29G, and 29B are arrayed at a pitch smaller than that of the vertically extending periodic pattern, presents a clearer repeated pattern than the vertically extending periodic pattern does. That is, since there is a close relationship between a pitch of the prismatic grooves 14 of the front light 10 and that of the pixels 20c, by controlling both pitches so as to lie in respectively appropriate ranges, the optical interference due to the above relationship can be more effectively prevented. More particularly, by setting a pitch P1 of the prismatic grooves 14 and a pitch P0 of the pixels 20c, both pitches being shown in FIG. 6, so as to satisfy the condition: $(1/2)P0 < P1 < (3/4)P0$, moire fringes can be more effectively reduced. Since the pixel pitch P0 of the liquid crystal display unit 20 is determined in accordance with the specification (the size and the resolution of a liquid crystal display panel) of an electronic apparatus on which the liquid crystal display device is mounted, by setting the pitch P1 of the prismatic grooves 14 of the front light 10 so as to satisfy the foregoing condition while taking the pixel pitch P0 into account, a liquid crystal display device producing no moire fringe and providing good visibility can be achieved.

Figure 7:
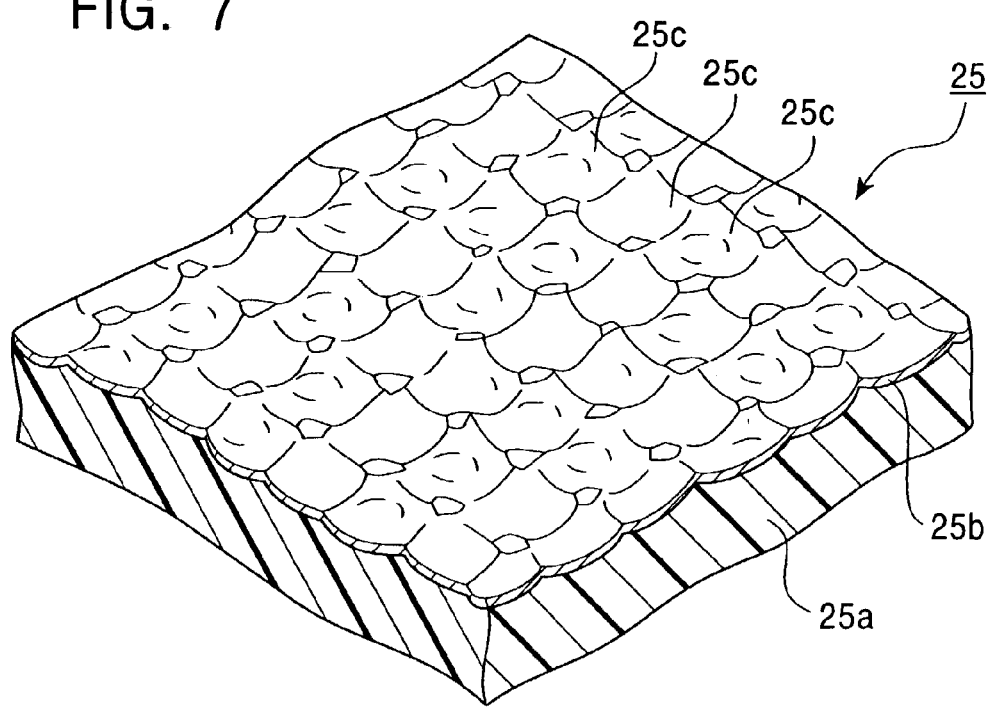
FIG. 7 is a perspective view illustrating the structure of a reflective layer shown in FIG. 3.

FIG. 7 is a perspective view illustrating the structure of the reflective layer 25 shown in FIG. 3, which is formed on the inner surface of the lower substrate 22 shown in FIG. 2.

As shown in FIG. 7, the reflective layer 25 is formed of a reflective film 25b, composed of a highly reflective metal such as Al or Ag, and an organic film 25a, composed of an organic resin such as an acrylic resin, for providing a predetermined surface shape to the reflective film 25b. A plurality of depressions 25c, each having a reflective surface, is formed on the surface of the reflective layer 25.

The organic film 25a is formed such that a flat resin layer composed of a photosensitive resin or the like is formed on the lower substrate 22 and then is cured by pressing a transcription mold, which has a surface formed so as to have a plurality of projections in order to obtain a reversed shape from the planed shape of the surface of the organic film 25a and which is composed of an acrylic resin or the like, on the surface of the resin layer. Then, the reflective film 25b is formed on the organic film 25a having depressions on the surface thereof in the above-described manner. The reflective film 25b is formed by, for example, sputtering or depositing a highly reflective metal such as Al or Ag.

In the first embodiment, the reflective layer 25 preferably has a reflection characteristic including a reflective luminance which has a substantially symmetric distribution with respective to the specular reflection angle of incident light. In order to provide such a reflection characteristic, the reflective layer 25 is formed by controlling the shapes of the concave surfaces of the plurality of depressions 25c formed on the surface of the reflective film 25b.

In the first embodiment, it is preferable that the depressions 25c are randomly formed so as to have depths in the range from 0.1 to 3 μm, pitches between the adjacent depressions 25c in the range from 5 to 100 μm, and concave surfaces having slanted angles in the range from −18° to +18°.

Figure 8:
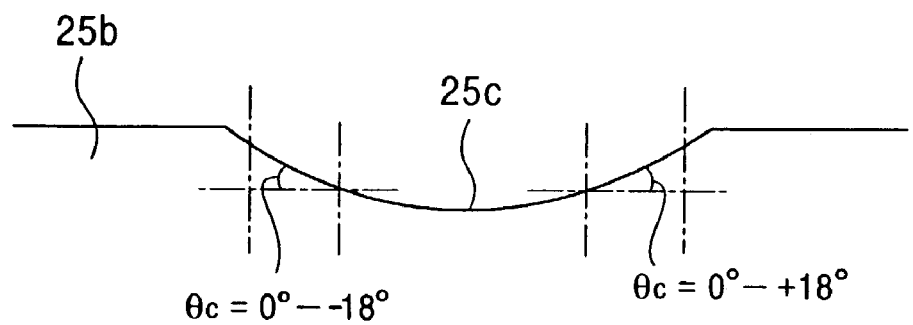
FIG. 8 illustrates the sectional shape of one of depressions shown in FIG. 7.

In this specification, "a depth of the depression" means a distance from the surface of part of the reflective film 25b where no depression is formed to the bottom of the depression and "a pitch between the adjacent depressions" means the distance between the centers of the adjacent round depressions in plan view. Also, as shown in FIG. 8, "a slanted angle of the concave surface of the depression" means an angle θc of a fine slope, having a width of 0.5 μm at any point of the concave surface of the depression 25c, with respect to the horizontal surface (the surface of the foregoing part of the reflective film 25b). When the slope inclines to the right or to the left, as shown in FIG. 8, with respect to the normal drawn perpendicular to the surface of the foregoing part of the reflective film 25b where no depression is formed, the angle θc is defined as being positive or negative, respectively.

In the first embodiment, the concave surfaces of the depressions 25c are formed so as to have a distribution of slanted angles in the range from −18° to +18° and the pitches between the adjacent depressions are randomly arranged in all directions parallel to the surface of the reflective layer 25. In other words, regularity of the pitches between the adjacent depressions 25c would cause colors of light to be interfered with each other, thereby causing reflected light to be colored. Also, when the distribution of slanted angles of the concave surfaces of the depressions 25c extends out of the range from −18° to +18°, the diffuse angle of reflected light is excessively widened (for example, the reflected light has a diffuse angle equal to or greater than 55° in the air) and, as a result, the reflected light has a reduced reflection intensity, whereby a bright display is not obtained.

Also, the depressions 25c having depths less than 0.1 μm fail to provide a sufficient light diffuse effect expected by forming the depressions on the reflective surface of the reflective layer 25, and those having depths greater than 3 μm require larger pitches so as to achieve a sufficient light reflective effect, thereby causing moire fringes to occur.

Also, when the pitches between the adjacent depressions 25c are less than 5 μm, constraints of manufacturing the transcription mold used for forming the organic film 25a cause problems such that a very long processing time is required, the unsatisfactory shapes of the concave surfaces of the depressions 25c for achieving a desired reflection characteristic are formed, interference of light occurs, and so forth. Accordingly, the preferable pitches between the adjacent depressions 25c are in the range from 5 to 100 μm.

Figure 9:
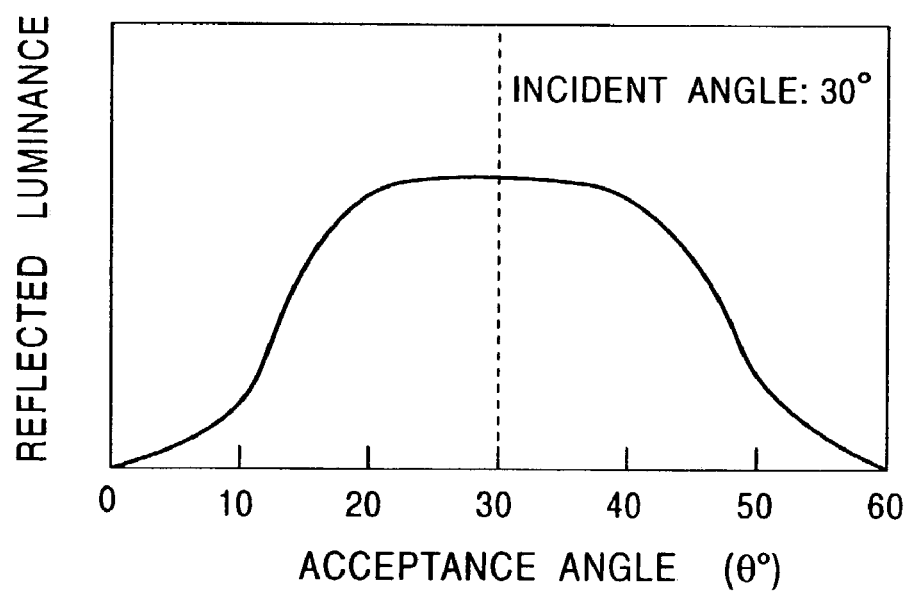
FIG. 9 illustrates the reflection characteristic of the reflective layer including the depressions shown in FIG. 8.

FIG. 9 illustrate the relationship between an acceptance angle (θ°) and a reflected luminance (a reflectance) when light is incident, at an incident angle of 30°, on the display surface (the upper surface) of the liquid crystal display unit 20 according to the first embodiment, and when the acceptance angle varies from the normal (0°) to 60° with respect to the specular reflection angle of 30° of the display surface. As shown in the figure, a reflectance which is symmetric and substantially uniform in a wide acceptance angle with respect to the specular reflection angle can be obtained. In particular, the reflectance is almost constant in the acceptance angle range from −10° to +10° with respect to the specular reflection angle, and accordingly, in this acceptance angle range, a display having substantially the same reflected luminance can be obtained even when viewed from any direction.

Because the depths and the pitches of the depressions 25c shown in FIG. 7 are controlled in the above described ranges and the concave surface of each depression 25c has a shape of part of a spherical surface, such a reflectance which is symmetric with respect to the specular reflection angle and which is almost constant in a wide acceptance angle range can be obtained. That is, by forming the depths and the pitches of the depressions 25c in a controlled manner, the slanted angles, which govern the reflection angle of light, of the concave surfaces of the depressions 25c are controlled so as to lie in a predetermined range, whereby the reflectance of the reflective film 25b can be controlled in a predetermined range. Also, since the concave surface of each depression 25c is a part of a spherical surface which is symmetrical with respect to all directions, a uniform refection can be obtained in a wide reflection direction of the reflective film 25b.

First Modification of Reflective Layer

In the liquid crystal display unit 20 according to the first embodiment, other than the foregoing reflective layer having a reflection characteristic in which the distribution of its reflected luminance is substantially symmetrical with respect to the foregoing specular reflection angle, another reflective layer having a reflection characteristic in which the distribution of its reflected luminance is asymmetrical with respect to the specular reflection angle can be used. The reflective layer having such a reflection characteristic will be described with reference to FIGS. 10 and 11.

The reflective layer having the foregoing reflection characteristic is formed by changing the shapes of the concave surfaces of the depressions 25c shown in FIG. 7. More particularly, the reflective layer in this modification has a similar structure to that, shown in the perspective view of FIG. 7, of the reflective layer 25 according to the first embodiment, in which the highly reflective film 25b is formed on the organic film 25a having a large number of the depressions 25c formed on its reflective surface so as to be adjacent to each other as if they overlapped with each other. Since the difference is only the profile of the concave surface of each depression 25c, components of the reflective layer in this modification will be described, referring again to FIG. 7.

Figure 10:
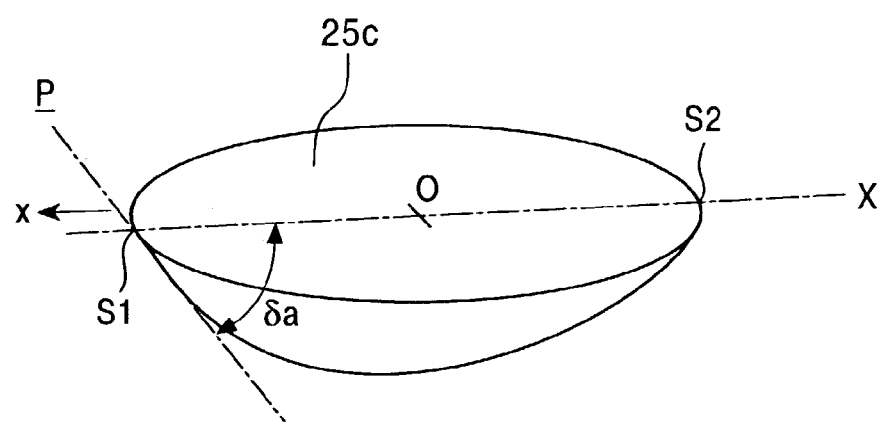
FIG. 10 is a perspective view illustrating a depression of a first modification of the reflective layer.
Figure 11:
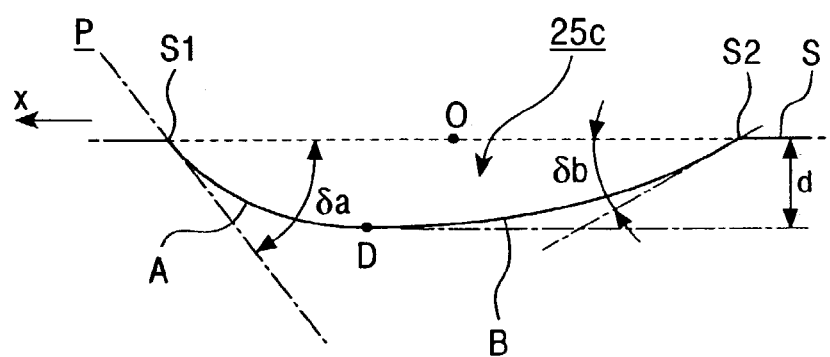
FIG. 11 is a sectional view along a vertical section X indicated in FIG. 10.

FIGS. 10 and 11 illustrate one of the large number of depressions 25c formed on the reflective layer in this modification, having a reflected luminance distribution which is asymmetrical with respect to the specular reflection angle, wherein FIG. 10 is a perspective view illustrating the depression and FIG. 11 is a sectional view along a specific vertical section X indicated in FIG. 10.

As shown in FIG. 10, the profile of the concave surface along the specific vertical section X of the depression 25c is formed of a first curve A extending from one edge S1 to a deepest point D and a second curve B continuously connected to the first curve A and extending from the deepest point D to another edge S2. At the deepest point D, these two curves lie at no slanted angle with respect to a reflective-film surface S (i.e., the surface of the part of the reflective film 25b where no depression is formed) and are connected to each other.

The "slanted angle" here means an angle of a tangent at any point of the profile of the concave surface along a specific vertical section of the depression 25c with respect to the horizontal surface (in this case, the reflective-film surface S).

With respect to the reflective-film surface S, the slanted angle of the first curve A is greater than that of the second curve B, and the deepest point D is displaced along the x-direction from the center O of the depression 25c. That is, with respect to the reflective-film surface S, the absolute mean value of the slanted angle of the first curve A is greater than that of the second curve B. The absolute mean values of the slanted angles of the first and second curves A and B of the plurality of depressions 25c formed on the surface of the reflective layer are randomly formed, with respect to the reflective-film surface S, in the ranges from 1 to 89° and from 0.5 to 88°, respectively.

Since the slanted angles of these two curves vary gently, the maximum absolute slanted angle δa of the first curve A is greater than the maximum absolute slanted angle δb of the second curve B. At the deepest point D where the first and second curves A and B are connected to each other, the tangent forms no slanted angle with respect to the reflective-film surface S and accordingly, the first curve A having a negative slanted angle and the second curve B having a positive slanted angle are smoothly connected to each other.

The maximum slanted angles δa of the plurality of depressions 25c formed on surface of the reflective layer 25 vary in the range from 2 to 90° and most of the maximum slanted angle δa vary in the range from 4 to 35°.

The concave surface of the depression 25c has a single minimal turning point (a point of the concave surface at which the slanted angle is zero, i.e., the deepest point) D. The distance from the minimal turning point D to the reflective-film surface S defines a depth d of each depression 25c, and the depths d of the plurality of depressions 25c are randomly formed in the range from 0.1 to 3 μm.

In the first embodiment, all of the plurality of depressions 25c are formed so as to have the specific sections X extending in the same direction and also to have the first curves A aligned in a single direction. That is, the x-direction shown in FIGS. 10 and 11 is a common direction to all the depressions 25c.

In the reflective layer 25 having the above-described structure, since the first curves A of the plurality of depressions 25c are aligned in a single direction, light diagonally incident on the surfaces of the depressions 25c from the upper left in FIG. 11 (from above and also the sides of the first curves A) is reflected along a direction which is shifted from its specular reflection direction to the normal of the reflective-film surface S.

On the contrary, light diagonally incident on the surfaces of the depressions 25c from the upper right in the figure (from above and also the sides of the second curves B) is reflected along a direction which is shifted from its specular reflection direction to the reflective-film surface S.

As a result, the total reflection characteristic of the specific vertical sections X, having a selectively increased reflectance in a specific direction by increasing a reflectance of light reflected against the surfaces of the second curves B, can be obtained.

Figure 12:
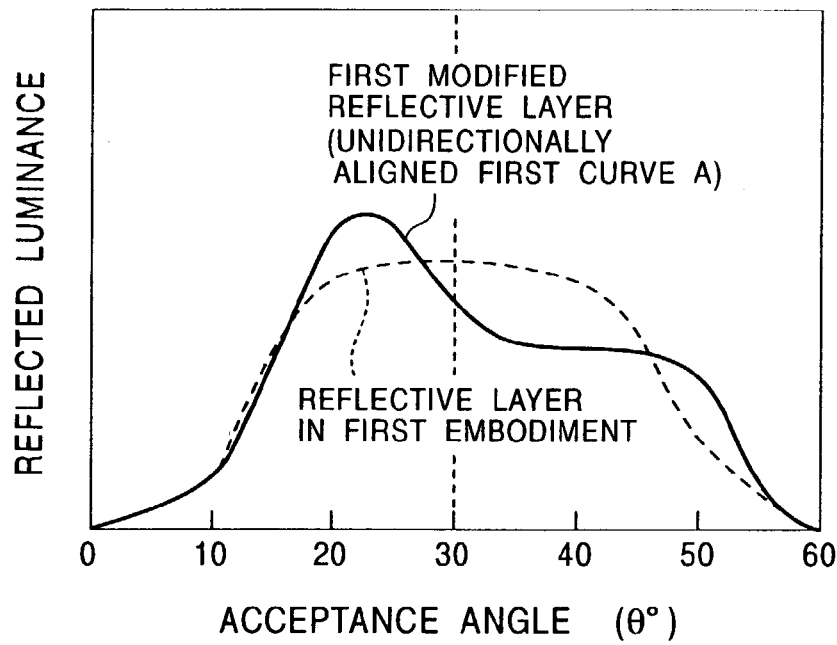
FIG. 12 illustrates the reflection characteristic of the reflective layer including the depressions shown in FIGS. 10 and 11.

FIG. 12 illustrates the relationship between an acceptance angle (θ°) and a reflected luminance (a reflectance), when light is incident, at an incident angle of 30°, on the reflective surface (the surface of the reflective film 25b) of the reflective film 25b used in the first modification of the first embodiment, and when the acceptance angle varies from the normal (0°) to 60° with respect to the specular reflection angle of 30° of the reflective surface. FIG. 12 also illustrates the relationship between the acceptance angle and the reflectance of the reflective layer 25 having the depressions 25c shown in FIG. 8. As shown in FIG. 12, the reflective layer in the first modification has the maximum reflectance at a smaller acceptance angle than the specular reflection angle of 30°, which is equal to the incident angle 30° in this example, and also has a high reflectance in the vicinity of the acceptance angle of the maximum reflectance.

Accordingly, with the reflective layer 25 having the above-described structure, since the reflective film forming the reflective surface of the reflective layer 25 is formed as described above, light transmitted from the light guiding plate 12 can be effectively reflected at and diffused by the reflective layer 25, and, in addition, the light reflected at the reflective layer 25 exhibits a directivity of high reflectance in a specific direction, the reflected light is emitted from the reflective layer 25 over a wide angle range and also effectively in a specific angle.

Second Modification of Reflective Layer

Also, another reflective layer having the following structure for providing a reflection characteristic in which the distribution of its reflected luminance is asymmetrical with respect to the specular reflection angle can be used. This will be described as a second modification of the reflective layer.

The reflected layer in this modification can be also formed by changing the shape of the concave surface of the depression 25c shown in FIG. 7 in the same fashion as the foregoing first modification. More particularly, the reflective layer in this modification has a similar structure to that, shown in the perspective view of FIG. 7, of the reflective layer 25 according to the first embodiment, in which the highly reflective film 25b is formed on the organic film 25a having a large number of the depressions 25c formed on its reflective surface so as to be adjacent to each other as if they overlapped with each other. Since the difference is only the profile of the concave surface of each depression 25c, components of the reflective layer in this modification will be described, referring again to FIG. 7.

Figure 13:
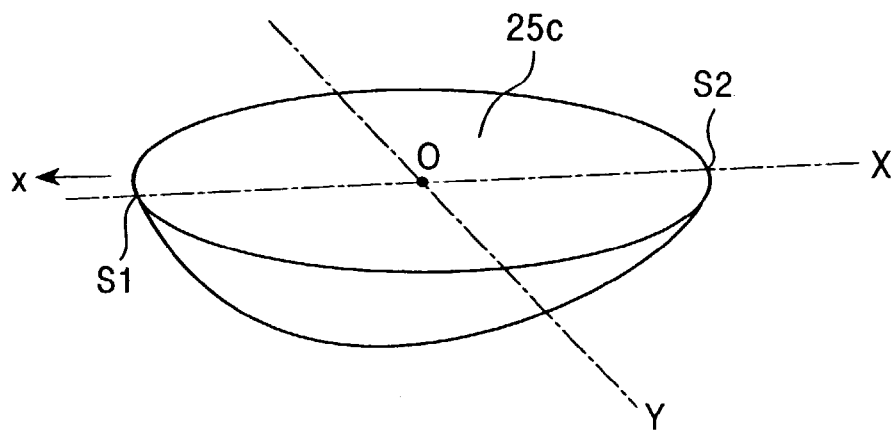
FIG. 13 is a perspective view illustrating a depression of a second modification of the reflective layer.
Figure 14:
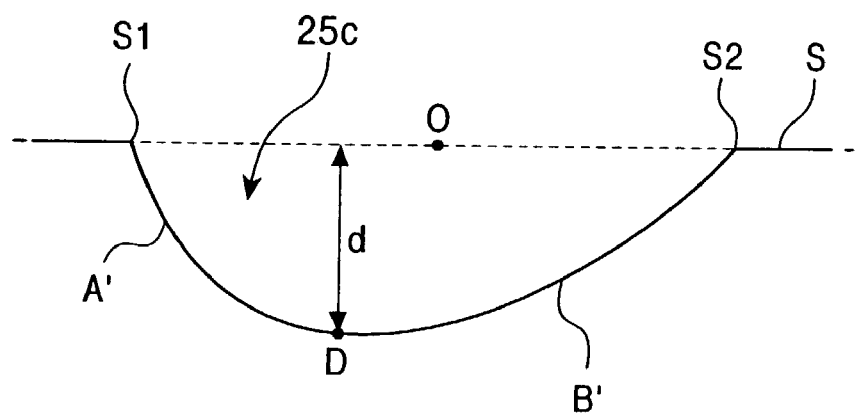
FIG. 14 is a sectional view along the vertical section X indicated in FIG. 13.
Figure 15:
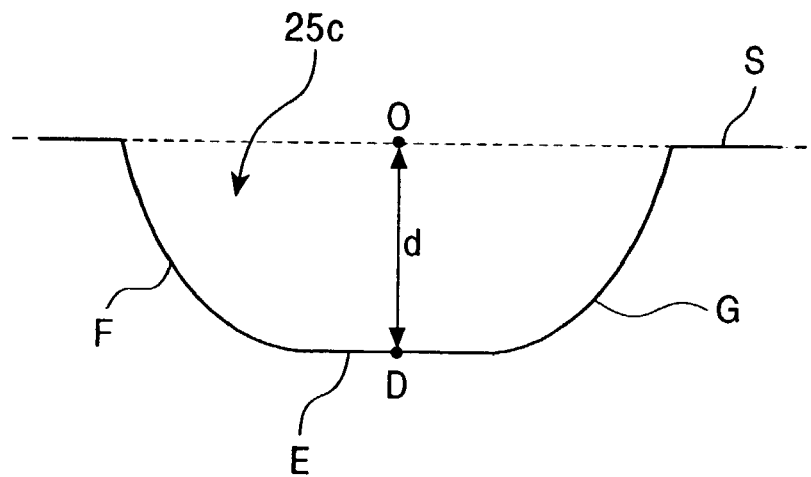
FIG. 15 is a sectional view along a vertical section Y indicated in FIG. 13.

FIGS. 13 to 15 illustrate the profile of the concave surface of one of the depressions 25c formed on the surface of the reflective film 25b of the reflective layer 25 used in the first embodiment.

FIG. 13 is a perspective view illustrating the depression 25c, FIG. 14 illustrates the section of the depression 25c along the X axis (referred to as the vertical section X), and FIG. 15 illustrates the section of the depression 25c along the Y axis (referred to as a vertical section Y) which is orthogonal to the X axis.

As shown in FIG. 14, the profile of the concave surface along the vertical section X of the depression 25c is formed of a first curve A' extending from the one edge S1 to the deepest point D and a second curve B' continuously connected to the first curve A' and extending from the deepest point D to the other edge S2. At the deepest point D shown in FIG. 14, both the first and second curves A' and B' extending respectively down to the right and down to the left in the figure do not lie at a slanted angle with respect to the reflective-film surface S and are smoothly connected to each other.

The "slanted angle" here means an angle of a tangent at any point of the profile of the concave surface along a specific vertical section of the depression 25c with respect to the horizontal surface (in this case, the reflective-film surface S).

With respect to the reflective-film surface S, the slanted angle of the first curve A' is greater than that of the second curve B', and the deepest point D is displaced along the X axis from the center O to the edge S1 of the depression 25c (in the x-direction). That is, with respect to the reflective-film surface S, the absolute mean value of the slanted angle of the first curve A' is greater than that of the second curve B'. The absolute mean values of the slanted angles of the first and second curves A' and B' of the plurality of depressions 25c formed on the surface of the reflective layer are randomly formed, with respect to the reflective-film surface S, in the ranges from 2 to 90° and from 1 to 89°, respectively.

Meanwhile, as shown in FIG. 15, the profile of the concave surface along the vertical section Y of the depression 25c is substantially symmetrical with respect to the center O of the depression 25c. The profile of the concave surface is formed of a shallow curve E, having a large curvature, i.e., having a nearly straight line, in the vicinity of the deepest point D of the depression 25c, and deep curves F and G to the left and right of the shallow curve E, respectively, each having a small curvature. The absolute slanted angles of the shallow curves E of the plurality of depressions 25c formed on the surface of the reflective layer 25 are, generally speaking, not more than 10°. Also, the absolute slanted angles of the deep curves F and G of the plurality of depressions 25c are randomly formed, for example, in the range from 2 to 90°. In addition, the depths d of the deepest points D are randomly formed in the range from 0.1 to 3 µm.

In this modification, all of the plurality of depressions 25c formed on the surface of the reflective layer 25 are formed such that the corresponding vertical sections X and Y extend in the respective same directions and that the corresponding first curves A' extending from the deepest points D to the edges S1 are aligned in a single direction. That is, the x-direction shown in FIGS. 13 and 14 serves as a common direction to all depressions 25c formed on the surface of the reflective layer 25.

In this modification, since all the depressions 25c formed on the surface of the reflective layer 25 are formed so as to extend along the same direction and the first curves A' extending from the corresponding deepest points D to the corresponding edges S1 are aligned in a single direction, light diagonally incident on the surfaces of the depressions 25c from the upper left in FIGS. 13 and 14 (from above and also the sides of the first curves A') is reflected along a direction which is shifted from its specular reflection direction to the normal of the reflective-film surface S.

On the contrary, light diagonally incident on the surfaces of the depressions 25c from the upper right in FIGS. 13 and 14 (from above and also the sides of the second curves B') is reflected along a direction which is shifted from its specular reflection direction to the reflective-film surface S.

Also, since the vertical section Y, which is orthogonal to the vertical section X, is formed of the shallow curve E having a large curvature and the deep curves F and G which lie both sides of the shallow curve E and which have small curvatures, the reflectance of the reflective surface of the reflective layer 25 in the specular direction can be increased.

Figure 16:
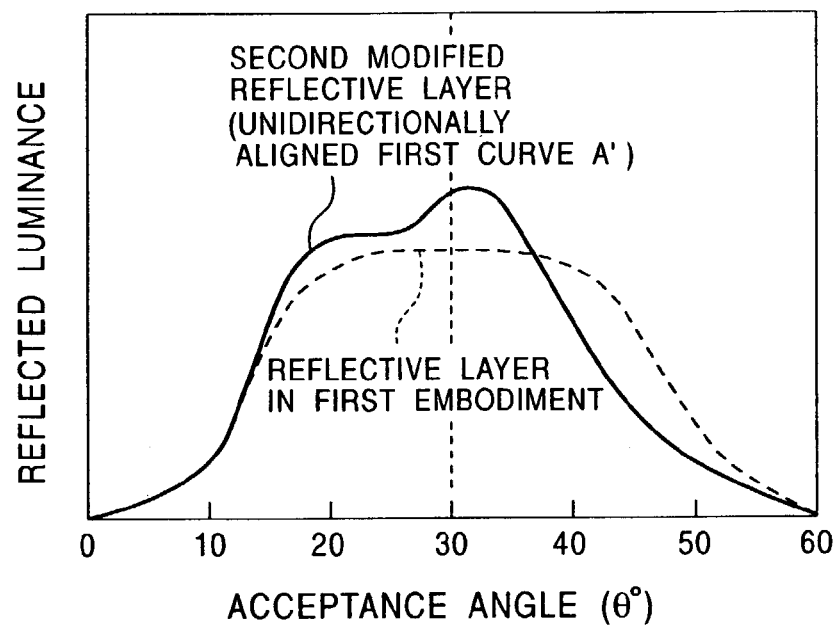
FIG. 16 illustrates the reflection characteristic of the reflective layer including the depressions shown in FIGS. 13 to 15.

As a result, as shown in FIG. 16, the total reflective characteristic at the vertical sections X is achieved such that reflected light is moderately focused in a specific direction while the reflectance in the specular direction is sufficiently maintained. FIG. 16 illustrates the relationship between an acceptance angle (θ°) and a reflected luminance (a reflectance), when light is incident on the surface of the reflective layer in this modification, at an incident angle of 30°, from above and from the left to the normal of the reflective-film surface S, and when the acceptance angle varies continuously from the normal (0°) to 60° with respect to the specular reflection angle of 30° of the reflective-film surface S. The reflection characteristic illustrated in this graph shows that the integrated value of the reflectance from 0° to 30°, lying in an angle range of not more than the specular reflection angle, is greater than that of the reflectance from 30° to 60°, lying an angle range of not less than the specular reflection angle, and that thus, the reflection direction tends to be shifted from the specular reflection direction to the normal.

Accordingly, in the liquid crystal display unit with the reflective layer 25 having such a structure, since the reflective film forming the reflective surface of the reflective layer 25 is formed as described above, light transmitted from the light guiding plate 12 can be effectively reflected and diffused by the reflective layer 25, and in addition, the light reflected at the reflective layer 25 exhibits a directivity of a high reflectance in a specific direction, the reflected light is emitted from the reflective layer 25 over a wide angle range and also effectively in a specific angle.

Active Matrix Liquid Crystal Display Unit

Although the liquid crystal display unit 20 is of a passive matrix type in the foregoing embodiment, an active-matrix liquid crystal display unit can be applicable to the liquid crystal display device according to the present invention. Since, in this case, the two-dimensional structure of the liquid crystal display unit is the same as that of the liquid crystal display unit 20 shown in FIG. 2 in the foregoing embodiment, the active matrix liquid crystal display unit will be described with reference to FIGS. 17 and 18 in addition to FIG. 2. That is, the active matrix liquid crystal display unit has the plurality of pixels 20c formed in a matrix array in plan view.

Figure 17:
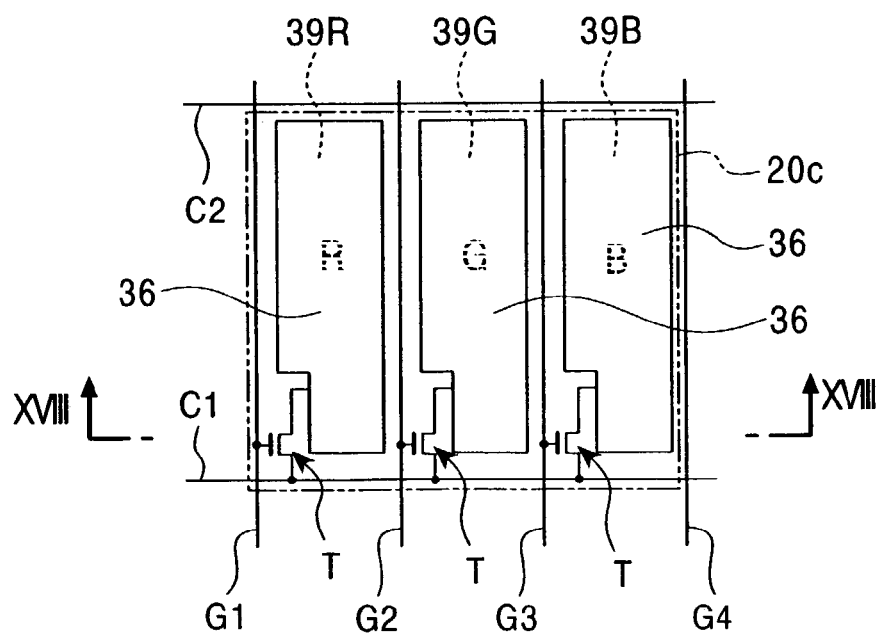
FIG. 17 is a magnified plan view illustrating the structure of one of pixels of an active-matrix liquid crystal display unit.
Figure 18:
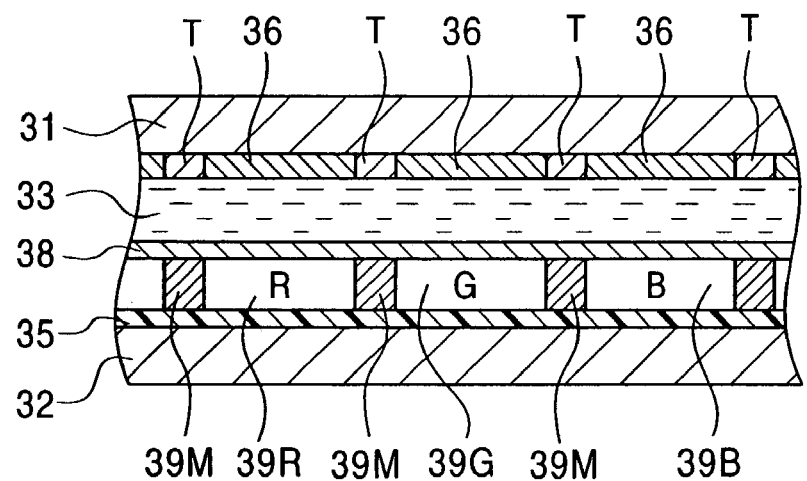
FIG. 18 is a sectional view taken along line XVIII—XVIII indicated in FIG. 17.

FIG. 17 is a magnified plan view illustrating the two-dimensional structure of the pixel 20c formed in the active-matrix liquid crystal display unit, and FIG. 18 is a sectional view taken along line XVIII—XVIII indicated in FIG. 17. The liquid crystal display unit shown in FIGS. 17 and 18 is formed of mutually opposing upper and lower substrates 31 and 32 and a liquid crystal layer 33 held therebetween. The upper substrate 31 has a plurality of substantially rectangular transparent electrodes 36 formed on the inner surface thereof in a matrix array in plan view and a plurality of pixel-switching transistor elements T formed also on the inner surface thereof so as to correspond to the respective transparent electrodes 36. The lower substrate 32 has a reflective layer 35 on the inner surface thereof, a color filter layer 39 formed on the reflective layer 35, and transparent electrodes 38 formed on the entire surface of the color filter layer 39. An area in which three transparent electrodes 36 corresponding to R, G, and B are formed corresponds to one pixel 20c. In FIG. 17, the transistor elements T are illustrated as circuit components of an equivalent circuit diagram for better understanding of the figure.

Each of the three transistor elements T for switching the corresponding transparent electrodes 36 has three terminals, respectively connected to the corresponding transparent electrode 36, to the corresponding one of scanning lines G1 to G3 extending vertically in the figure between the adjacent transparent electrodes 36, and to a signal line C1 extending horizontally in the figure. The color filter layer 39 formed on the lower substrate 32 has color filters 39R, 39G, and 39B disposed therein so as to correspond to the respective transparent electrodes 36 and also has a black matrix 39M formed in a latticed array in plan view so as to extend between adjacent two of the color filters 39R, 39G, and 39B. Although not shown in the figure, in order to prevent light incident on the upper surface of the liquid crystal display unit from entering the transistor elements T, the scanning lines, or the signal lines, both being connected to the corresponding transistor elements T, the upper substrate 31 has another black matrix formed in a lattice array in plan view so as to surround each of the transparent electrodes 36.

Any one of the reflective layers having the structures described in the foregoing embodiment can be used as the reflective layer 35 of the active-matrix liquid crystal display unit in this case.

The liquid crystal display unit having the foregoing structure performs a display by controlling potentials of the transparent electrodes 36 with the corresponding transistor elements T so as to control a state of light being transmitted through the liquid crystal layer 33 held between the transparent electrodes 36 and the transparent electrodes 38 close to the lower substrate 32.

In the active-matrix liquid crystal display unit, since the light-shielding black matrix 39M is formed in a latticed array in plan view so as to surround each of the transparent electrodes 36, the periodic pattern of the pixels 20c tends to be clearer than that of the pixels 20c in the passive-matrix liquid crystal display unit, that is, optical interference due to the relationship between the periodical array of the pixels 20c and the oblique angle of the prismatic grooves 14 of the front light 10 is likely to occur. However, in the liquid crystal display device according to the first embodiment, since the prismatic grooves 14 are formed so as to extend at an angle with the alignment direction of the pixels 20c, the foregoing optical interference is prevented and thus, reduction in visibility caused by moire fringes can be effectively prevented.

As described above, even when the active-matrix liquid crystal display unit is used so as to form the liquid crystal display device according to the present invention, the liquid crystal display device has no moire fringe in its display area and thus performs a uniformly bright, high quality display.

The color filter layer 39 is formed on the reflective layer 35 in FIG. 18; alternatively, the liquid crystal display unit may have a structure in which pixel-switching electrodes are formed close to the lower substrate 32 so as to also serve as a reflective layer and a color filter layer is formed close to the upper substrate 31.

SECOND EMBODIMENT

Figure 19:
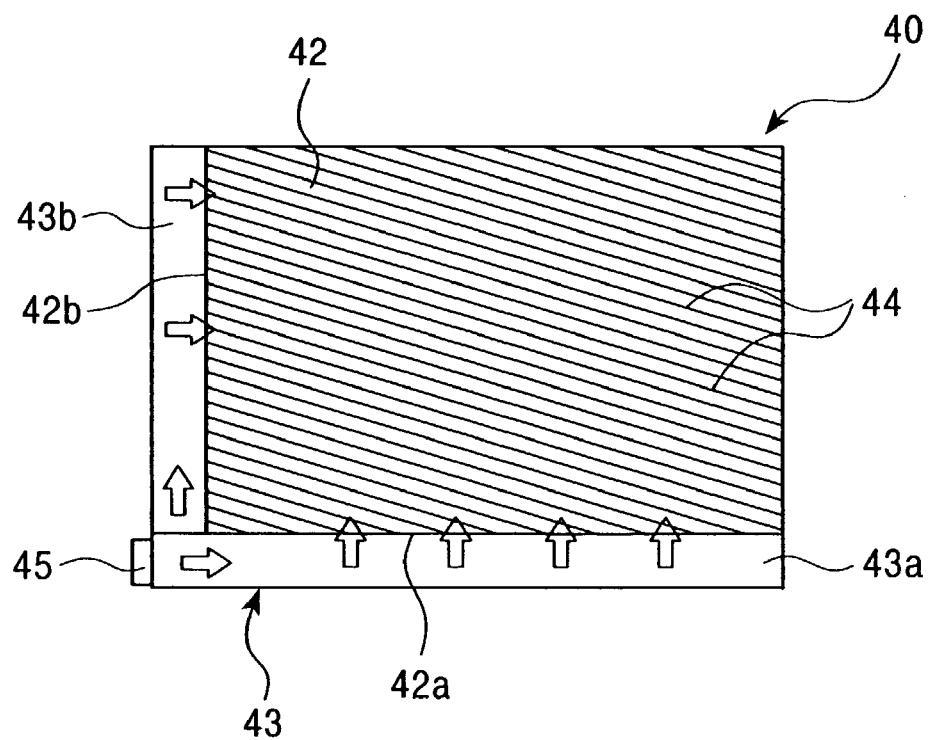
FIG. 19 is a plan view illustrating the structure of a front light according to a second embodiment of the present invention.

FIG. 19 is a plan view illustrating the structure of a front light 40 according to a second embodiment of the present invention. The front light 40 shown in this figure is formed of a light guiding plate 42, an intermediate light guide 43 having an L-shape in plan view and disposed along two side surfaces 42a and 42b of the light guiding plate 42, and a light emitting element 45 disposed on an end surface of the intermediate light guide 43.

The light guiding plate 42 has substantially the same flat shape as that of the light guiding plate 12 according the first embodiment shown in FIGS. 1 to 3, and has a plurality of prismatic grooves 44, formed parallel to each other in plan view, on one side thereof and a flat surface on the other side thereof. Thus, light incident on the two side surfaces 42a and 42b is reflected at the prismatic grooves 44 and is then emitted as illumination light. The prismatic grooves 44 are formed at an oblique angle with respect to the side surface 42a of the light guiding plate 42 so that light emitted from the light emitting element 45 with a single light source propagates uniformly in the light guiding plate 42 and also so that optical interference with an illumination object such as a liquid crystal display unit is prevented. Preferably, the oblique angle of the prismatic grooves 44 is the same as the oblique angle α of the prismatic grooves 14 according to the first embodiment.

The intermediate light guide 43 has rod-shaped light guiding sections 43a and 43b disposed in an L-shaped configuration and the light emitting element 45 is disposed on the end surface of the light guiding section 43a, which is close to the connection between the light guiding sections 43a and 43b. The light guiding section 43a extends along the side surface 42a of the light guiding plate 42. Although not shown in the figure, a plurality of grooves, each having a wedge shape which is similar to that of the groove of the intermediate light guide 13 shown in FIG. 4, is formed on the side surfaces, facing away from the light guiding plate 42, of the light guiding sections 43a and 43b. Also, reflective films may be formed on the side surfaces having the grooves thereon if necessary.

In the front light 40 having the above-described structure according to the second embodiment, most of light emitted from the light emitting element 45 propagates in the light guiding section 43a, to which the light emitting element 45 is disposed, and is introduced into the light guiding plate 42 via the side surface 42a of the light guiding plate 42. Part of light entered in the light guiding section 43a is introduced into the light guiding section 43b via the bottom end surface, shown in the figure, of the light guiding section 43b and is then introduced into the light guiding plate 42 via the side surface 42b of the light guiding plate 42. As a result, the single-light-source front light 40 can uniformly emit light from the entire surface of the light guiding plate 42.

THIRD EMBODIMENT

Figure 20:
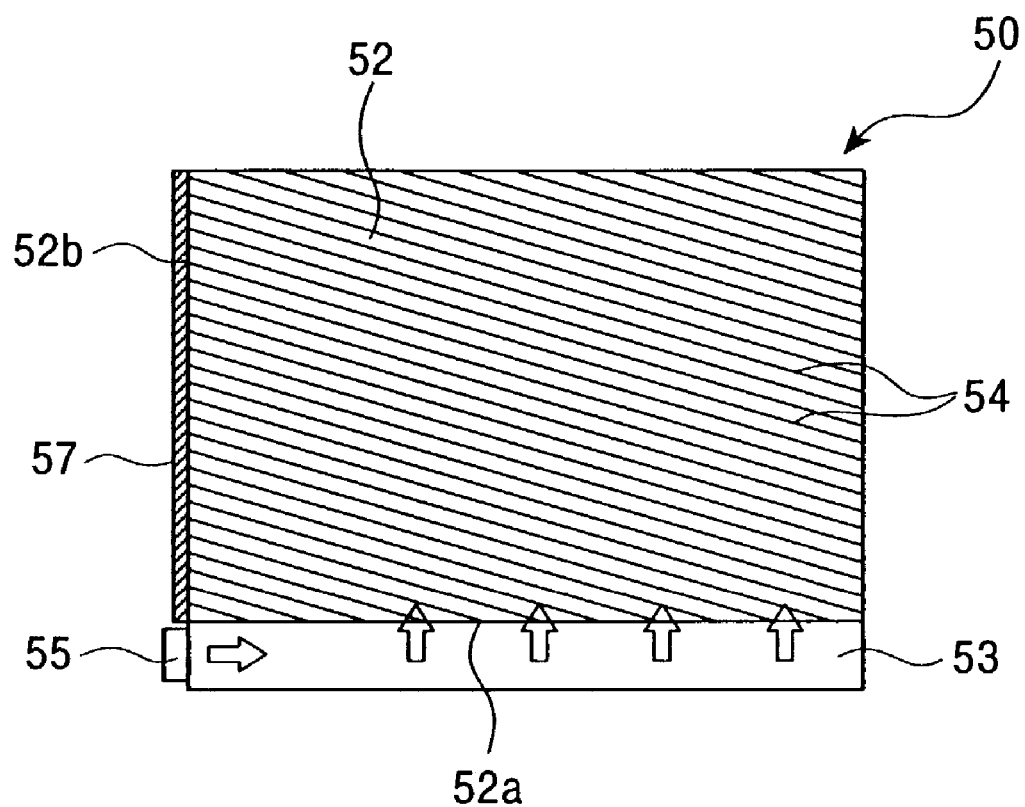
FIG. 20 is a plan view illustrating the structure of a front light according to a third embodiment of the present invention.
Figure 21A:
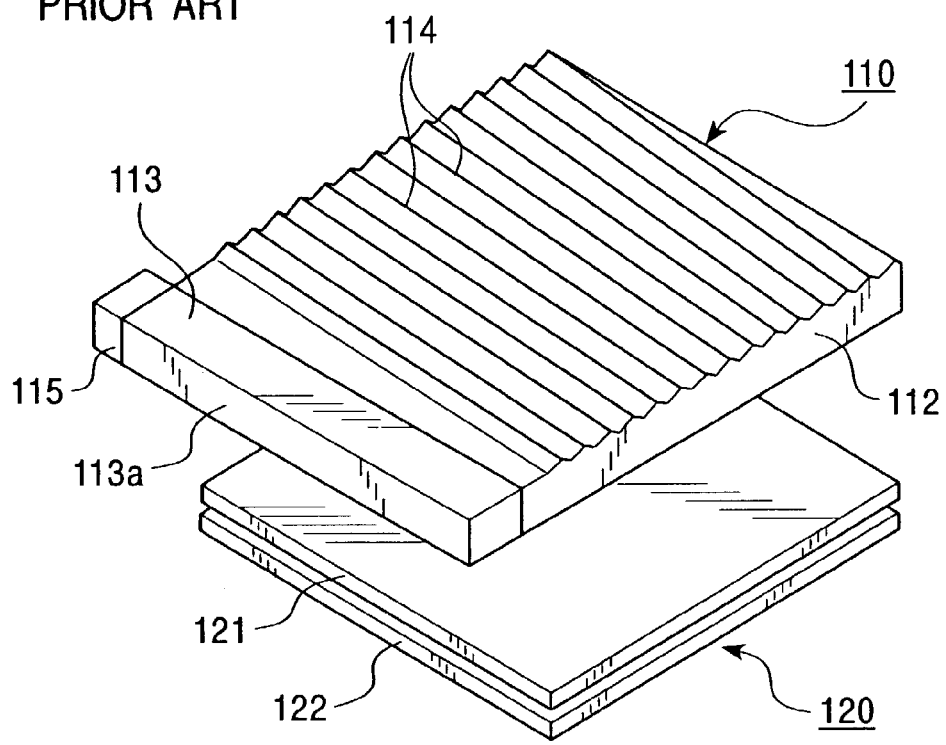
FIG. 21A is a perspective view of a known liquid crystal display device and FIG. 21B is a plan view of a front light shown in FIG. 21A.
Figure 21B:
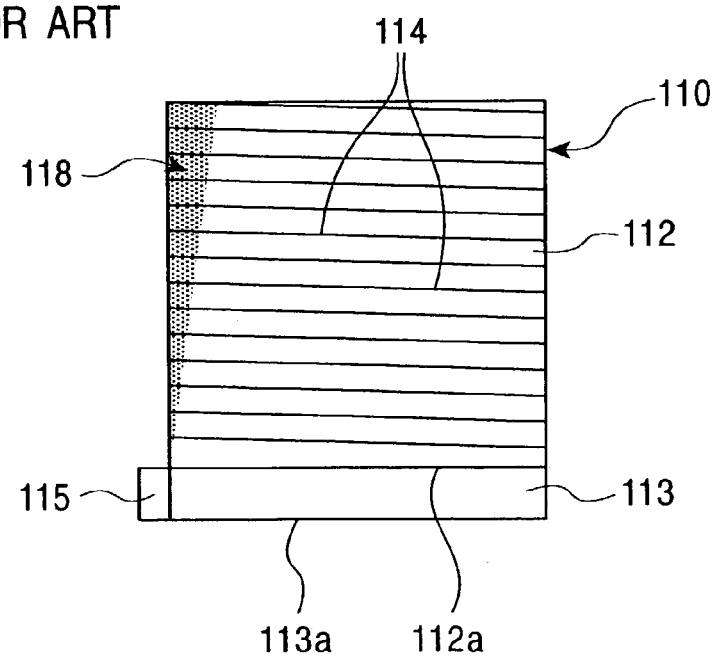

FIG. 20 is a plan view illustrating the structure of a front light 50 according to a third embodiment of the present invention. The front light 50 shown in this figure is formed of a light guiding plate 52, a rod-shaped intermediate light guide 53 disposed along a side surface 52a of the light guiding plate 52, and a light emitting element 55 disposed on one end surface of the intermediate light guide 53. The front light 50 according to the third embodiment contains a light guiding plate 52 that has a side surface 52b close to the light emitting element 55 and a reflective film 57, made from a highly-reflective metal thin film composed of Al, Ag, or the like, formed on the side surface 52b.

The light guiding plate 52 has substantially the same flat shape as that of the light guiding plate 12 according the first embodiment shown in FIGS. 1 to 3, and has a plurality of prismatic grooves 54, formed parallel to each other in plan view, on one side thereof and a flat surface on the other side thereof. Thus, light incident on the side surface 52a via the intermediate light guide 53 is reflected at the prismatic grooves 54 and is then emitted as illumination light. The prismatic grooves 54 are formed at an oblique angle with respect to the side surface 52a of the light guiding plate 52 so that light emitted from the light emitting element 55 with a single light source propagates uniformly in the light guiding plate 52 and also so that optical interference with an illumination object such as a liquid crystal display unit is prevented. Preferably, the oblique angle of the prismatic grooves 54 is the same as the oblique angle α of the prismatic grooves 14 according to the first embodiment.

Since the intermediate light guide 53 according to the third embodiment can be formed so as to have the same structure as that of the intermediate light guide 13 according to the first embodiment, its detailed description will be omitted.

In the front light 50 having the above-described structure according to the third embodiment, since the reflective film 57 is formed on the side surface 52b close to a side part of the light guiding plate 52, the side part lying close to the light emitting element 55 and being likely to output a reduced quantity of light with a single-light-source front light, light propagating in the light guiding plate 52 does not leak out from the side surface 52b and thus light reflected against the reflective film 57 can be used as illumination light, whereby the foregoing side part can be illuminated more brightly. As a result, the front light 50 with a single light source according to the third embodiment can uniformly emit light from the entire surface of the light guiding plate 52.

EXAMPLES

The present invention will be described in further detail based on the following examples, although the present invention is not limited to these examples.

In each example, a front light having the structure shown in FIGS. 1 to 3 is prepared and a liquid crystal display device is formed by disposing the front light on the front surface of a liquid crystal display unit in order to confirm that, with this structure, moire fringes are unlikely to occur and a uniformly bright display is achieved.

First, intermediate light guides and light guiding plates are made from a resin material by injection molding. Each intermediate light guide is made from an acrylic resin so as to form a quadratic prism having dimensions of 73.5×4.8×1.0 mm and to have a large number of V-shaped grooves, having a point angle of 110° and disposed at a pitch of 0.24 μm, formed on a side surface thereof. The V-shaped grooves are formed so as to become thinner towards the end surface of the intermediate light guide on which a light emitting element is disposed, and more particularly, they are formed so that the grooves become deeper, starting from the side of the light emitting element, in the range from 12 to 71 μm. The intermediate light guide has a reflective film, made from an Ag thin film and having a thickness of 200 nm, formed on the foregoing side surface thereof on which the V-shaped grooves are formed.

Then, an LED is disposed on one end surface of the intermediate light guide. NSCW215S (brand name, made by Nichia Corporation) is used as the LED.

Each light guiding plate is formed so as to have dimensions of 73.5 (W)×50 (L)×1.0 mm and to have the structure shown in FIG. 1 in which a plurality of grooves is formed on one side thereof. The light guiding plates are made from ARTON (brand name, made by JSR Corporation). As shown in Table 1, the prismatic grooves are formed so as to extend at a variety of angles (oblique angles α) with respect to the side surfaces of the light guiding plates on which the corresponding intermediate light guides are disposed and to have a variety of pitches. In each example, since pixels of a liquid crystal display unit, which will be described later, used in combination with the light guiding plate are aligned so as to extend substantially parallel to the side surface of the light guiding plate, the foregoing oblique angle α coincides with an angle (an oblique angle β) formed between the extending direction of the prismatic grooves and the alignment direction of the pixels of the liquid crystal display unit.

Also, each of the prismatic grooves of these light guiding plates has steep and gentle slopes formed so as to commonly provide slope angles of 43° and 2.3°, respectively.

Subsequently, each front light is formed by disposing the intermediate light guide on the side surface of the light guiding plate prepared as described above.

Finally, each liquid crystal display device is formed by disposing the front light on the front of the liquid crystal display unit. By operating each of these liquid crystal display devices, moire fringes and a dark area of the light guiding plate, the dark area lying close to the light emitting element, are visually observed. Also, the width of the dark area, extending along the leftmost part of the upper side of the light guiding plate in FIG. 2, is measured. The visually observed and measured results are also shown in Table 1.

Each liquid crystal display unit is a color liquid crystal display unit of an active-matrix type having a pixel pitch of 0.255 mm. The color filters of this active-matrix liquid crystal display device are aligned in a vertical stripe array shown in FIG. 6.

TABLE 1

| sample No. | oblique angle α (°) | pitch of prismatic grooves (mm) | occurrence of moire fringes | width of dark area (mm) |
|---|---|---|---|---|
| 1 | 7.5 | 0.16 | No | 5.9 |
| 2 | 7.5 | 0.18 | No | 5.9 |
| 3 | 7.5 | 0.12 | Yes | 5.9 |
| 4 | 7.5 | 0.14 | Almost No | 5.9 |
| 5 | 7.5 | 0.20 | Yes | 5.9 |
| 6 | 7.5 | 0.14–0.18 | Yes in curved shapes | 5.9 |
| 7 | 0 | 0.16 | Yes | 0 |
| 8 | 0 | 0.18 | Yes | 0 |
| 9 | 6.5 | 0.16 | No | 5.9 |
| 10 | 6.5 | 0.18 | No | 5.9 |
| 11 | 8.5 | 0.16 | No | 5.9 |
| 12 | 8.5 | 0.18 | No | 5.9 |
| 13 | 10 | 0.16 | No | 5.9 |
| 14 | 10 | 0.18 | No | 5.9 |
| 15 | 22.5 | 0.16 | No | 18.4 |
| 16 | 22.5 | 0.18 | No | 18.4 |

As shown in Table 1, it is confirmed that as the oblique angle α (equal to the oblique angle β) of the prismatic grooves becomes larger, the moire fringes become less on one hand and the width of the dark area tends to become greater on the other hand. Accordingly, in order to reduce the moire fringes to a degree which cause no practical problem and also to prevent the light guiding plate from becoming excessively large, the foregoing oblique angle α (equal to the oblique angle β) is preferably not more than 10° and is more preferably in the range from 6.5° to 8.5°.

Since the product (L×tan α) of the tangent of the oblique angle α and the length (L) of the light guiding plate is about 6.58 mm when the oblique angle α is equal to 7.5° and when the width of the dark area of each of the samples shown in Table 1 and formed so as to have the oblique angles α equal to 7.5° is 5.9 mm, it is confirmed that the dark area of the light guiding plate is displaced outside the display area by setting the extended width ΔW of the light guiding plate not less than L×tan α.

Also, since the samples (Nos. 1, 2, and 4) formed so as to have the oblique angles a equal to 7.5° and the pitches of the prismatic grooves greater than 0.12 mm and less than 0.2 mm provide good results, it is confirmed that the pitch of the prismatic grooves should be set greater than half and less than three quarters the pixel pitch of 0.255 mm of the liquid crystal display unit.

What is claimed is:

1. An illumination device comprising:
    a light guiding plate; an intermediate light guide disposed along one side surface of the light guiding plate; and a light emitting element disposed on a longitudinal end surface of the intermediate light guide,
    wherein light illuminated by the light emitting element and transmitted through the one side surface of the light guiding plate via the intermediate light guide is introduced into the light guiding plate and the light propagating in the light guiding plate is emitted from an output surface of the light guiding plate so as to illuminate an illumination object disposed behind the light guiding plate, wherein a part of the light guiding plate, through which the illumination object is displayed in a transmissive manner, serves as a display area, and wherein the light guiding plate is formed so as to extend beyond the display area in a longitudinal direction towards the light emitting element.

2. The illumination device according to claim 1, wherein an outer side surface of the intermediate light guide serves as a prismatic surface formed so as to have a plurality of grooves, each having a wedge shape in sectional view, and the prismatic surface has a reflective film formed thereon.

3. The illumination device according to claim 1, further comprising: a light shield so as to cover the intermediate light guide, the light emitting element, and a part of the light guiding plate extending, the part lying close to the intermediate light guide; and a reflective film formed on the inner surface of the light shield.

4. The illumination device according to claim 1, wherein, the light guiding plate has two surfaces, one serving as the output surface and the other serving as a reflective surface for reflecting light propagating in the light guiding plate, the reflective surface including a plurality of mutually parallel, prismatic grooves, each having a wedge shape in sectional view, and wherein an extending direction of the prismatic grooves forms an oblique angle with the one side surface of the light guiding plate on which the intermediate light guide is disposed.

5. The illumination device according to claim 4, wherein, when the light guiding plate extends towards the light emitting element by a length of $\Delta W$, the extended width $\Delta W$, the oblique angle $\alpha$ of the prismatic grooves, and the length L of the light guiding plate, the length L being orthogonal to the extending direction of the intermediate light guide, satisfy the condition: $\Delta W \geq L \times \tan \alpha$.

6. The illumination device according to claim 4, wherein the prismatic grooves extend so as to form an oblique angle a greater than 0° and not more than 10° with the one side surface of the light guiding plate on which the intermediate light guide is disposed.

7. The illumination device according to claim 6, wherein the prismatic grooves extend so as to form the oblique angle a in the range from 6.5° to 8.5°.

8. The illumination device according to claim 4, wherein each of the prismatic grooves is formed of a pair of slopes, each having a sloped angle with respect to the reflective surface, and one steep slope close to the intermediate light guide is formed so as to have a greater slope angle than the other gentle slope, and wherein a slope angle $\theta 1$ of the gentle slope is in the range from 1.0° to 10° and a slope angle $\theta 2$ of the steep slope is in the range from 42° to 44°.

9. A liquid crystal display device comprising:
the illumination device according to claim 1; and
a liquid crystal display unit disposed close to the output surface of a light guiding plate of the illumination device.

10. The liquid crystal display device according to claim 9, wherein the liquid crystal display unit comprises mutually opposing upper and lower substrates and liquid crystal molecules held between the substrates and having a positive dielectric anisotropy, wherein the lower substrate has a reflective layer and a color filter laminated on an inner surface thereof in that order, and wherein the reflective layer has a reflection characteristic in which a reflected luminance of the reflective layer is substantially constant over a region of a reflection angle not less than 15°.

11. The liquid crystal display device according to claim 10, wherein the reflective layer has a reflection characteristic in which a distribution of the reflected luminance is substantially symmetrical with respect to a specular reflection angle of incident light.

12. The liquid crystal display device according to claim 10, wherein the reflective layer has a reflection characteristic in which a distribution of the reflected luminance is asymmetrical with respect to a specular reflection angle of incident light.

13. The liquid crystal display device according to claim 9, wherein the liquid crystal display unit is of an active matrix type.

14. The liquid crystal display device according to claim 9, wherein the liquid crystal display unit is of a passive matrix type.

15. A liquid crystal display device comprising:
an illumination device, the illumination device comprising: a light guiding plate; an intermediate light guide disposed along one side surface of the light guiding plate; and a light emitting element disposed on a longitudinal end surface of the intermediate light guide, wherein the light guiding plate includes two mutually opposing surfaces, one serving as an output surface for outputting light which is emitted from the light emitting element and which is introduced into the light guiding plate via the intermediate light guide, and the other serving as a reflective surface for reflecting light propagating in the light guiding plate and including a plurality of mutually parallel, prismatic grooves, each having a wedge shape in sectional view; and
a liquid crystal display unit disposed so as to oppose the output surface of the light guiding plate,
wherein the prismatic grooves of the light guiding plate have a pitch P1 in the range $(1/2)P0 < P1 < (3/4)P0$ with respect to a pitch P0 of pixels of the liquid crystal display unit.

16. The liquid crystal display device according to claim 15, wherein the prismatic grooves extend so as to form an angle $\beta$ greater than 0° and not more than 10° with an aligning direction of the pixels, aligned along an extending direction of the intermediate light guide, of the liquid crystal display device.

17. The liquid crystal display device according to claim 16, wherein the prismatic grooves extend so as to form the angle $\beta$ in the range from 6.5° to 8.5° with the aligning direction of the pixels, aligned along the extending direction of the intermediate light guide, of the liquid crystal display device.

18. An illumination device comprising:
a light guiding plate; an intermediate light guide disposed along two side surfaces of the light guide plate; and a light emitting element disposed on the intermediate light guide,
wherein the light guiding plate includes two mutually opposing surfaces, one serving as an output surface and the other serving as a reflective surface for reflecting light propagating in the light guiding plate, the reflective surface including a plurality of mutually parallel, prismatic grooves, each having a wedge shape in sectional view and extending so as to form an oblique angle with any one of the two side surfaces of the light guiding plate on which the intermediate light guide is disposed, and wherein the intermediate light guide comprises two light guiding sections disposed in an L-shaped configuration in plan view and along the two side surfaces of the light guide plate.

19. An illumination device comprising:

a light guiding plate; an intermediate light guide disposed along one side surface of the light guiding plate; and a light emitting element disposed on a longitudinal end surface of the intermediate light guide, wherein light illuminated by the light emitting element and transmitted through the one side surface of the light guiding plate via the intermediate light guide is introduced into the light guiding plate and the light propagating in the light guiding plate is emitted from an output surface of the light guiding plate so as to illuminate an illumination object disposed behind the light guiding plate, wherein a part of the light guiding plate, through which the illumination object is displayed in a transmissive manner, serves as a display area, and wherein the light guiding plate has two surfaces and is formed so as to extend beyond the display area, one surface serving as the output surface and the other surface serving as a reflective surface for reflecting light propagating in the light guiding plate, the reflective surface including a plurality of mutually parallel, prismatic grooves, each having a wedge shape in sectional view, and an extending direction of the prismatic grooves forms an oblique angle with the one side surface of the light guiding plate on which the intermediate light guide is disposed.

* * * * *